(12) United States Patent
Zhang et al.

(10) Patent No.: US 11,301,163 B2
(45) Date of Patent: Apr. 12, 2022

(54) NOF-BASED READ CONTROL METHOD, APPARATUS, AND SYSTEM

(71) Applicant: Huawei Technologies Co., Ltd., Shenzhen (CN)

(72) Inventors: Shengguang Zhang, Hangzhou (CN); Haiyan Hu, Hangzhou (CN); Xinqian Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 16/911,736

(22) Filed: Jun. 25, 2020

(65) Prior Publication Data
US 2020/0326879 A1 Oct. 15, 2020

Related U.S. Application Data

(63) Continuation of application No. PCT/CN2018/123749, filed on Dec. 26, 2018.

(30) Foreign Application Priority Data

Dec. 27, 2017 (CN) .......................... 201711444963.0

(51) Int. Cl.
*G06F 3/06* (2006.01)
*G06F 13/42* (2006.01)

(52) U.S. Cl.
CPC ............ *G06F 3/0655* (2013.01); *G06F 3/061* (2013.01); *G06F 3/0679* (2013.01); *G06F 13/4221* (2013.01); *G06F 2213/0026* (2013.01)

(58) Field of Classification Search
CPC ...... G06F 3/0659; G06F 3/0688; G06F 3/061; G06F 12/0246; G06F 3/0679;
(Continued)

(56) References Cited

U.S. PATENT DOCUMENTS

| | | | |
|---|---|---|---|
| 8,396,072 B2 * | 3/2013 | Jokinen ................. | H04W 72/08 370/445 |
| 2006/0227725 A1 * | 10/2006 | Huotari ............... | H04L 43/0817 370/254 |

(Continued)

FOREIGN PATENT DOCUMENTS

| | | |
|---|---|---|
| CN | 101044721 A | 9/2007 |
| CN | 102664803 A | 9/2012 |

(Continued)

OTHER PUBLICATIONS

NVM Express:"NVM Express Revision 1.3," May 1, 2017, total 282 pages.
(Continued)

*Primary Examiner* — Hashem Farrokh
(74) *Attorney, Agent, or Firm* — Slater Matsil, LLP

(57) ABSTRACT

A NOF-based read control method, apparatus, and system belong to the field of networked storage. The method includes: receiving, by a NOF engine by using a communication link, a read request sent by a host; sending at least one read command to an NVMe hard disk based on the read request; and when congestion occurs on the communication link, generating a congestion flag corresponding to the communication link, and sending the congestion flag to the NVMe hard disk, where the congestion flag is used to instruct the NVMe hard disk to suspend processing of the read command corresponding to the communication link.

20 Claims, 13 Drawing Sheets

(58) Field of Classification Search
CPC .............. G06F 3/0655; G06F 3/0656; G06F 2213/0026; G06F 13/4221; H04L 47/115; H04L 47/6255; H04L 47/26; H04L 47/623
USPC ........................................................ 711/154
See application file for complete search history.

(56) References Cited

U.S. PATENT DOCUMENTS

| | | | |
|---|---|---|---|
| 2008/0294816 | A1 | 11/2008 | Fuji |
| 2013/0230043 | A1 | 9/2013 | Anandakumar et al. |
| 2017/0206034 | A1* | 7/2017 | Fetik .................. G06F 21/78 |
| 2018/0157445 | A1 | 6/2018 | Gissin et al. |

FOREIGN PATENT DOCUMENTS

| | | |
|---|---|---|
| CN | 102742320 A | 10/2012 |
| CN | 102823202 A | 12/2012 |
| CN | 103583022 A | 2/2014 |
| CN | 103718597 A | 4/2014 |
| CN | 104536701 A | 4/2015 |
| CN | 106612240 A | 5/2017 |
| CN | 106775434 A | 5/2017 |
| CN | 107077426 A | 8/2017 |
| WO | 2007027481 A2 | 3/2007 |
| WO | 2016160075 A1 | 10/2016 |

OTHER PUBLICATIONS

NVM Express."NVM Express over Fabrics Revision 1.0," Jun. 5, 2016 , total 49 pages.

* cited by examiner

NOF-BASED READ CONTROL METHOD, APPARATUS, AND SYSTEM

CROSS-REFERENCE TO RELATED APPLICATIONS

This application is a continuation of International Application No. PCT/CN2018/123749, filed on Dec. 26, 2018, which claims priority to Chinese Patent Application No. 201711444963.0, filed on Dec. 27, 2017. The disclosures of the aforementioned applications are hereby incorporated by reference in their entireties.

TECHNICAL FIELD

This application relates to the field of networked storage, and in particular, to a read control method, apparatus, and system based on a non-volatile memory express over fabric (NOF).

BACKGROUND

In June 2016, the non-volatile memory express (NVMe) protocol organization released the NOF 1.0 protocol. The NOF protocol provides a communication capability of accessing a network for an NVMe device.

A typical application model based on the NOF protocol includes a host and a controller. The controller includes a NOF engine and a plurality of NVMe hard disks connected to the NOF engine. The host and the controller are connected by using a network. The NOF engine and the NVMe hard disk are connected by using a PCIe bus. For example, the host reads data from the controller. The host sends one or more read requests to the NOF engine by using the network. The NOF engine forwards the one or more read requests to the NVMe hard disk. The NVMe hard disk feeds back data corresponding to each read request to the NOF engine, and the NOF engine then sends the data to the host by using the network.

However, because the network between the host and the controller may be congested, when the NOF engine sends data to the host by using the network, the host may fail to normally receive the data due to network congestion. Consequently, a read request response fails. Currently, no technology is available to resolve the network congestion problem in a NOF application scenario.

SUMMARY

Embodiments of this application provide a NOF-based read control method, apparatus, and system, to resolve a network congestion problem in a NOF application scenario. The technical solutions are as follows:

According to a first aspect of this application, a NOF-based read control method is provided, and the method includes: receiving, by a NOF engine by using a communication link, a read request sent by a host; sending, by the NOF engine, at least one read command to an NVMe hard disk based on the read request; when congestion occurs on the communication link, generating, by the NOF engine, a congestion flag corresponding to the communication link; and sending, by the NOF engine, the congestion flag to the NVMe hard disk, where the congestion flag is used to instruct the NVMe hard disk to suspend processing of the read command corresponding to the communication link. Correspondingly, the NVMe hard disk receives the at least one read command sent by the NOF engine, and the read command is generated by the NOF engine based on the read request sent by the host by using the communication link. The NVMe hard disk receives the congestion flag sent by the NOF engine, and the congestion flag is sent by the NOF engine when the congestion occurs on the communication link. The NVMe hard disk suspends, based on the congestion flag, the processing of the read command corresponding to the communication link.

In a network congestion scenario, the NVMe hard disk can suspend processing of a read command that has been obtained and has not been processed. This resolves the following problem: After data of the read command is read, the data is directly discarded due to network congestion, and consequently an entire read process fails. The NVMe hard disk suspends the processing of the read command, and this can avoid invalid occupation of transmission bandwidth (PCI bandwidth) between the NOF engine and the NVMe hard disk, and reduce waste.

In a first possible implementation of the first aspect, the sending, by the NOF engine, the congestion flag to the NVMe hard disk includes: determining, by the NOF engine, a submission queue corresponding to the communication link, where the submission queue is used to store an entry (Submission Queue Entry, SQE) command in the submission queue corresponding to the communication link, and the SQE command includes a read command and/or a write command; sending, by the NVMe hard disk, a command read request to the NOF engine, where the command read request is used to read the SQE command in the submission queue corresponding to the communication link; and when receiving the command read request that is of the NVMe hard disk and that is for the submission queue, sending, by the NOF engine, an SQE command carrying the congestion flag to the NVMe hard disk. The NVMe hard disk receives the SQE command that carries the congestion flag and that is sent by the NOF engine.

In this implementation, the congestion flag is transferred by using the SQE command in the submission queue. Therefore, a congestion notification mechanism between the NOF engine and the NVMe hard disk is implemented without adding additional signaling as much as possible, and the NVMe hard disk is further controlled to suspend the processing of the read command corresponding to the communication link. There is a high probability that an SQE command that has not been read by the NVMe hard disk exists in the submission queue. A reserved field in the SQE command is used to transfer the congestion flag, with almost no additional signaling or data amount. This reduces occupation of transmission bandwidth between the NOF engine and the NVMe hard disk.

In a second possible implementation of the first aspect, the sending, by the NOF engine, the congestion flag to the NVMe hard disk includes: determining, by the NOF engine, a submission queue corresponding to the communication link, where the submission queue is used to store an SQE command corresponding to the communication link; and sending, by the NOF engine, a register write command pointing to a first user-defined address to the NVMe hard disk, where the first user-defined address is an address used to store the congestion flag, and the register write command carries an identifier of the submission queue and the congestion flag. The NVMe hard disk receives the register write command that points to the first user-defined address and that is sent by the NOF engine. The first user-defined address is the address used to store the congestion flag, and the register write command carries the congestion flag and the identifier of the submission queue corresponding to the communication link. The NVMe hard disk performs a write operation on the first user-defined address according to the register write command.

In this implementation, the congestion flag is transferred by using the register write command pointing to the first user-defined address. Therefore, a congestion notification mechanism between the NOF engine and the NVMe hard disk can be implemented without changing a normal read/write mechanism of the SQE command, and the NVMe hard disk is further controlled to suspend the processing of the read command corresponding to the communication link.

In a third possible implementation of the first aspect, the sending, by the NOF engine, the congestion flag to the NVMe hard disk includes: determining, by the NOF engine, a submission queue corresponding to the communication link, where the submission queue is used to store an SQE command corresponding to the communication link; and sending, by the NOF engine, a management command containing user-defined content to the NVMe hard disk, where the user-defined content carries an identifier of the submission queue and the congestion flag. The NVMe hard disk receives the management command that contains the first user-defined content and that is sent by the NOF engine. The first user-defined content carries the identifier of the submission queue and the congestion flag, and the submission queue is a queue corresponding to the communication link.

In this implementation, the congestion flag is transferred by using the management command containing the first user-defined content. Therefore, a congestion notification mechanism between the NOF engine and the NVMe hard disk can be implemented by using a management command provided by an NVMe protocol, and the NVMe hard disk is further controlled to suspend the processing of the read command corresponding to the communication link.

In a fourth possible implementation of the first aspect, the suspending, by the NVMe hard disk based on the congestion flag, processing of the read command corresponding to the communication link includes: performing, by the NVMe hard disk, at least one of the following operations based on the congestion flag: suspending a command read request for the submission queue; setting a read command that has been retrieved from the submission queue and has not been completed to a suspended state; and decreasing a scheduling weight corresponding to the submission queue to a first weight.

In this implementation, processing of the read request corresponding to the submission queue is suspended. This can save processing resources of the NVMe hard disk and transmission bandwidth between the NOF engine and the NVMe hard disk.

With reference to any one of the first aspect, the first possible implementation of the first aspect, the second possible implementation of the first aspect, or the third possible implementation of the first aspect, in a fifth possible implementation of the first aspect, after the sending, to the NVMe hard disk, an SQE command to which the congestion flag is added, the method further includes: sending, by the NOF engine, an idle frame to the host at an interval by using the communication link; when receiving an acknowledgment signal of the idle frame, generating, by the NOF engine, a congestion release flag corresponding to the communication link; and sending, by the NOF engine, the congestion release flag to the NVMe hard disk, where the congestion release flag is used to instruct the NVMe hard disk to resume the processing of the read command corresponding to the communication link. The NVMe hard disk receives the congestion release flag sent by the NOF engine. The congestion release flag is sent by the NOF engine when the congestion on the communication link between the NOF engine and the host is released. The NVMe hard disk resumes, based on the congestion release flag, the processing of the read command corresponding to the communication link.

In this implementation, when the communication link between the NOF engine and the host is congested, the NOF engine sends the congestion flag to the NVMe hard disk, and the NVMe hard disk suspends, based on the congestion flag, the processing of the read command corresponding to the communication link. In this way, in a network congestion scenario, the NVMe hard disk suspends processing of a read command that has been obtained and has not been processed. This resolves the following problem: After data of the read command is read, the data cannot be successfully sent to the host due to network congestion, and consequently an entire read process fails. This reduces sending of invalid data in the network congestion scenario, and avoids a more congested network.

With reference to the fifth possible implementation of the first aspect, in a sixth possible implementation of the first aspect, the NOF engine determines the submission queue corresponding to the communication link, where the submission queue is used to store the SQE command corresponding to the communication link; and when receiving a command read request that is of the NVMe hard disk and that is for the submission queue, the NOF engine sends an SQE command carrying the congestion release flag to the NVMe hard disk. The NVMe hard disk sends the command read request to the NOF engine. The command read request is used to read the SQE command in the submission queue corresponding to the communication link. The NVMe hard disk receives the SQE command that carries the congestion release flag and that is sent by the NOF engine.

In this implementation, the congestion release flag is transferred by using the SQE command in the submission queue. Therefore, a congestion release notification mechanism between the NOF engine and the NVMe hard disk is implemented without adding additional signaling as much as possible, and the NVMe hard disk is further controlled to suspend the processing of the read command corresponding to the communication link. There is a high probability that an SQE command that has not been read by the NVMe hard disk exists in the submission queue. A reserved field in the SQE command is used to transfer the congestion flag, with almost no additional signaling or data amount.

With reference to the fifth possible implementation of the first aspect, in a seventh possible implementation of the first aspect, the NOF engine determines the submission queue corresponding to the communication link, where the submission queue is used to store the SQE command corresponding to the communication link; and the NOF engine sends a register write command pointing to a second user-defined address to the NVMe hard disk, where the second user-defined address is an address used to store the congestion release flag, and the register write command carries the identifier of the submission queue and the congestion release flag. The NVMe hard disk receives the register write command that points to the second user-defined address and that is sent by the NOF engine. The second user-defined address is the address used to store the congestion release flag, and the register write command carries the identifier of the submission queue corresponding to the communication link and the congestion release flag. The NVMe hard disk performs a write operation on the second user-defined address according to the register write command.

In this implementation, the congestion release flag is transferred by using the register write command pointing to the second user-defined address. Therefore, a congestion release notification mechanism between the NOF engine and the NVMe hard disk is implemented without changing a normal read/write mechanism of the SQE command, and the NVMe hard disk is further controlled to resume the processing of the read command corresponding to the communication link.

With reference to the fifth possible implementation of the first aspect, in an eighth possible implementation of the first aspect, the NOF engine determines the submission queue corresponding to the communication link, where the submission queue is used to store the SQE command corresponding to the communication link; and the NOF engine sends a management command containing second user-defined content to the NVMe hard disk, where the second user-defined content carries the identifier of the submission queue and the congestion release flag. The NVMe hard disk receives the management command that contains the second user-defined content and that is sent by the NOF engine. The second user-defined content carries the congestion release flag and the identifier of the submission queue corresponding to the communication link.

In this implementation, the congestion release flag is transferred by using the management command containing the second user-defined content. Therefore, a congestion release notification mechanism between the NOF engine and the NVMe hard disk can be implemented by using a management command provided by an NVMe protocol, and the NVMe hard disk is further controlled to resume the processing of the read command corresponding to the communication link.

With reference to the fifth possible implementation of the first aspect, in a ninth possible implementation of the first aspect, the NVMe hard disk performs at least one of the following operations based on the congestion release flag: resuming the command read request for the submission queue; switching a read command that has been retrieved from the submission queue and has not been completed from a suspended state to an execution state; and increasing a scheduling weight corresponding to the submission queue to a second weight.

In this implementation, the NOF engine sends the congestion release flag to the NVMe hard disk when the congestion on the communication link is released, and the NVMe hard disk resumes, based on the congestion release flag, the processing of the read command corresponding to the communication link. In this way, in a scenario in which network congestion has been released, the NVMe hard disk resumes processing of a read command that has been obtained and has not been processed, thereby ensuring a success rate of reading data by the host.

According to a second aspect of this application, a NOF-based read control method is provided and is applied to a NOF engine, where a data buffer corresponding to a communication link is disposed in the NOF engine, and the method includes: receiving, by the NOF engine by using the communication link, a read request sent by a host, where the read request is used to request to read data of a first data amount, and the first data amount exceeds a size of the data buffer corresponding to the communication link; splitting, by the NOF engine, the read request into K read commands, where the read command is used to request to read data of a second data amount, and the second data amount is less than the first data amount; sending, by the NOF engine, m read commands to an NVMe hard disk, where m≤K, and a product of m and the second data amount is not greater than the size of the data buffer corresponding to the communication link; and suspending, by the NOF engine when congestion occurs on the communication link, sending of a remaining read command to the NVMe hard disk.

In this implementation, when there is the data buffer on the NOF engine side, the NOF engine controls a quantity of read commands sent to the NVMe hard disk. Therefore, an amount of data read by using a read command being processed by the NVMe hard disk does not exceed a size of the data buffer. Even if the network congestion occurs on the communication link, the NOF engine suspends delivering of a read command to the NVMe hard disk to resolve the congestion problem. The NVMe hard disk does not need to sense the congestion process. This reduces signaling interaction and occupation of transmission bandwidth between the NOF engine and the NVMe hard disk.

In addition, in this implementation, a respective data buffer is disposed for each communication link, and a plurality of communication links do not share a same data buffer. Therefore, even if network congestion occurs on a communication link, and a data buffer corresponding to the communication link is occupied, not all data buffers in the NOF engine are occupied by read data corresponding to the communication link, and therefore a reading process of another communication link is not affected. In this way, all communication links are independent of each other. Even if one or more communication links are congested, a normal receiving and sending process of a remaining communication link is not affected.

In a first possible implementation of the second aspect, after the suspending, by the NOF engine when congestion occurs on the communication link, sending of a remaining read command to the NVMe hard disk, the method further includes: receiving, by the NOF engine, data read by the NVMe hard disk according to the m read commands; storing, by the NOF engine, the data in the data buffer corresponding to the communication link; and sending, by the NOF engine when the congestion on the communication link is released, the data in the data buffer to the host by using the communication link.

In a second possible implementation of the second aspect, after the sending, by the NOF engine when the congestion on the communication link is released, the data in the data buffer to the host by using the communication link, the method further includes: continuing, by the NOF engine, to send n read commands to the NVMe hard disk, where n≤K−m, and a product of n and the second data amount is not greater than the size of the data buffer.

According to a third aspect of this application, a NOF-based read control apparatus is provided. The apparatus includes units or means for performing the read control method implemented by the NOF engine in any one of the first aspect or the optional implementations of the first aspect.

According to a fourth aspect of this application, a NOF-based read control apparatus is provided. The apparatus includes units or means for performing the read control method implemented by the NVMe hard disk in any one of the first aspect or the optional implementations of the first aspect.

According to a fifth aspect of this application, a NOF-based read control apparatus is provided, where a data buffer corresponding to a communication link is disposed in the apparatus. The apparatus includes units or means for performing the read control method implemented by the NOF engine in any one of the second aspect or the optional implementations of the second aspect.

According to a sixth aspect of this application, a NOF engine is provided. The NOF engine includes a processor and a memory, the memory stores at least one instruction, and the at least one instruction is executed by the processor to perform the read control method implemented by the NOF engine in any one of the first aspect or the optional implementations of the first aspect.

According to a seventh aspect of this application, an NVMe hard disk is provided. The NVMe hard disk includes a controller and a memory, the memory stores at least one instruction, and the at least one instruction is executed by the controller to perform the read control method implemented by the NVMe hard disk in any one of the first aspect or the optional implementations of the first aspect.

According to an eighth aspect of this application, a NOF engine is provided. The NOF engine includes a processor and a memory, the memory stores at least one instruction, and the at least one instruction is executed by the processor to perform the read control method implemented by the NOF engine in any one of the second aspect or the optional implementations of the second aspect.

According to a ninth aspect of this application, a computer-readable storage medium is provided. The storage medium stores at least one instruction, and the at least one instruction is executed to perform the read control method implemented by the NOF engine in any one of the first aspect or the optional implementations of the first aspect.

According to a tenth aspect of this application, a computer-readable storage medium is provided. The storage medium stores at least one instruction, and the at least one instruction is executed to perform the read control method implemented by the NVMe hard disk in any one of the first aspect or the optional implementations of the first aspect.

According to an eleventh aspect of this application, a computer-readable storage medium is provided. The storage medium stores at least one instruction, and the at least one instruction is executed to perform the read control method implemented by the NOF engine in any one of the second aspect or the optional implementations of the second aspect.

BRIEF DESCRIPTION OF THE DRAWINGS

FIGS. 7A and 8B show a flowchart of a NOF-based read control method according to another example embodiment of this application;

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Figure 1:
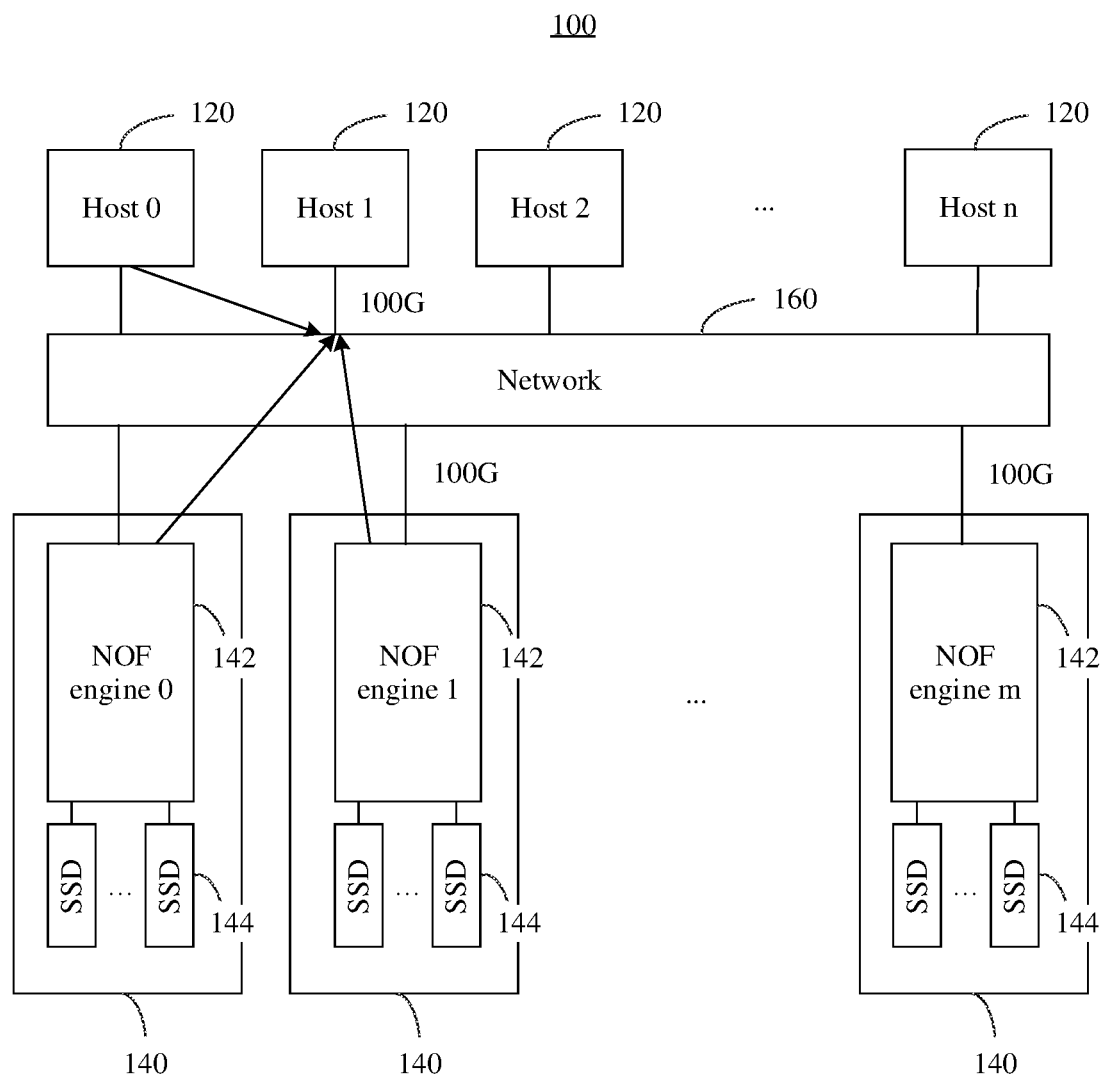
FIG. 1 is a schematic structural diagram of a NOF storage system 100 according to an example embodiment of this application.

FIG. 1 is a schematic structural diagram of a NOF storage system 100 according to an example embodiment of this application. The NOF storage system 100 includes a host 120 and a NOF controller 140.

There may be one or more hosts 120. The host 120 is configured to read or write data from or to the NOF controller 140 through remote direct memory access (Remote Direct Memory Access, RDMA). FIG. 1 is described by using an example in which there are a plurality of hosts 120. For example, the hosts 120 include a host 0 to a host n, and n is a positive integer. The plurality of hosts 120 may belong to a same user, or may belong to different users.

In different embodiments, the host 120 may be a service server, a network host, a computing node, or the like. The plurality of hosts 120 may be of different types. A specific type of the host 120 is not limited in this embodiment, provided that the host 120 supports a NOF protocol.

The hosts 120 are connected to a plurality of NOF controllers 140 by using a network 160. Optionally, the network 160 is a (Fabric) network with a fiber channel architecture, and the fabric network is a network formed by interconnecting a plurality of switches based on a fibre channel (FC) protocol. The fabric network includes a plurality of switching gateways and communication lines. The communication line may be an optical cable or an electrical cable. When the communication line is an optical cable, the switching gateway may be an optical switching gateway. When the communication line is an electrical cable, the switching gateway may be a router and/or a switch. For example, access bandwidth of each host 120 on the network 160 is 100 GB, and access bandwidth of each NOF controller 140 on the network 160 is 100 GB.

There may be one or more NOF controllers 140. Each NOF controller 140 has a respective device identity (ID), and different NOF controllers 140 are distinguished by using different device IDs. One or more NOF controllers 140 may run on a same physical carrier. FIG. 1 is described by using an example in which there are a plurality of NOF controllers 140. For example, the NOF controllers 140 include a NOF controller 0 to a NOF controller m, and m is a positive integer.

Each NOF controller 140 includes a NOF engine 142 and at least one NVMe hard disk 144. The NVMe hard disk 144 is a solid state drive (SSD) supporting an NVMe protocol. The NOF engine 142 is connected to the host 120 by using the network 160, and is connected to the at least one NVMe hard disk 144 by using a PCIe bus. Each NVMe hard disk 144 uses the NOF engine 142 as an access object. The NOF engine 142 is responsible for protocol conversion between a network protocol and a PCIe protocol, and data forwarding processing.

Figure 2:
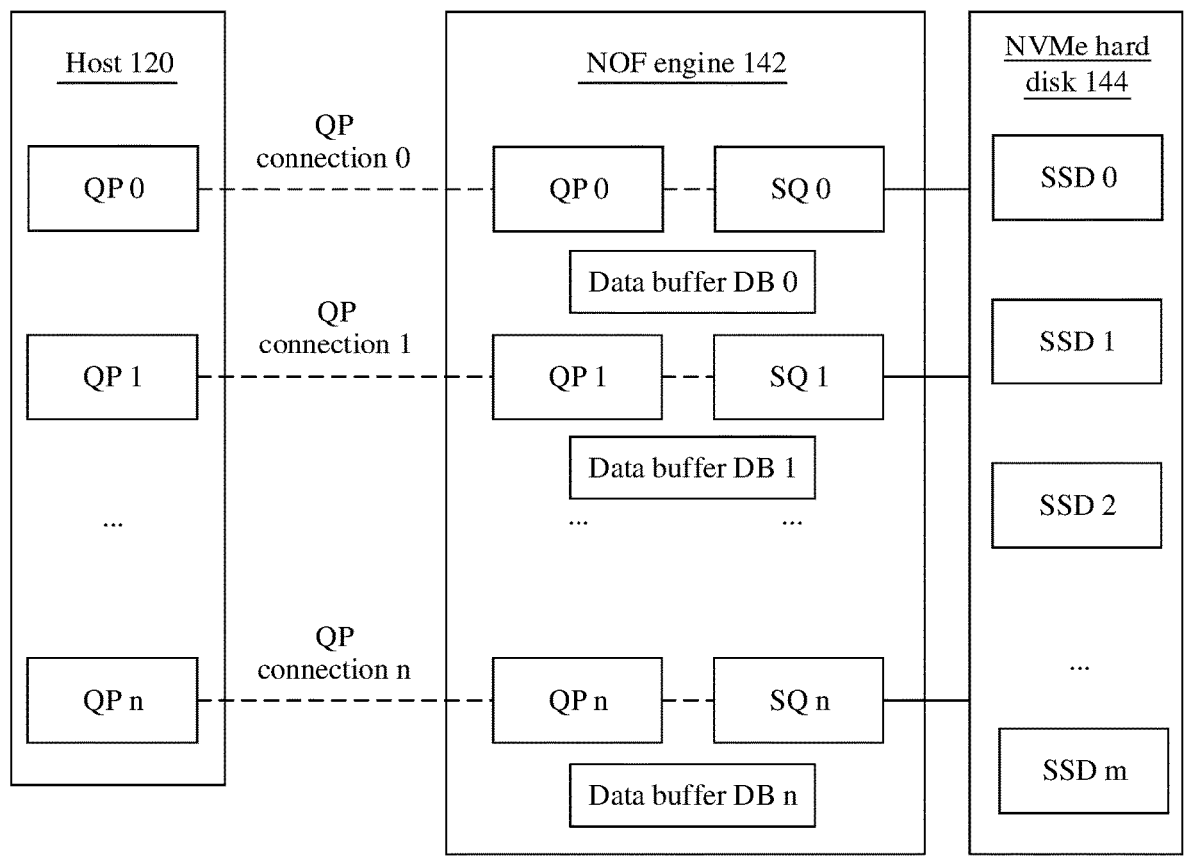
FIG. 2 is a schematic structural diagram of a NOF storage system 100 according to another example embodiment of this application.

With reference to FIG. 2, one or more communication links may be established between one host 120 and one NOF controller 140. The communication link may be a queue pair (Queue Pair, QP) connection. The QP connection is a transmission link borne on an Ethernet physical line. One Ethernet physical line may bear one or more QP connections, and each QP connection has a unique communication link identifier. The communication link identifier may be denoted as a QPID, and different QP connections are distinguished by using different QPIDs. For example, the host 120 has n queues QP 0 to QP n, and the NOF engine 142 has n corresponding queues QP 0 to QP n. The QP 0 in the host 120 and the QP 0 in the NOF engine 142 form a QP connection 0, a QP 1 in the host 120 and a QP 1 in the NOF engine 142 form a QP connection 1, and by analogy, the QP n in the host 120 and the QP n in the NOF engine 142 form a QP connection n.

Optionally, a queue pair may also be referred to as an RDMA queue pair. A queue in the queue pair is also referred to as a completion queue (Completion Queue, CQ). The CQ queue in the NOF engine 142 is configured to buffer an RDMA read request or write request from the host 120.

In the NOF engine 142, there is a submission queue (Submission Queue, SQ) corresponding to each CQ queue (or communication link). The SQ queue is configured to store an input/output (input/output, I/O) command that needs to be sent by the NOF engine 142 to the NVMe hard disk 144. The I/O command is also referred to as an SQE command. The SQE command includes a read command and/or a write command. Optionally, there is a one-to-one correspondence between a CQ queue and an SQ queue. For example, a completion queue CQ 0 corresponds to a submission queue SQ 0, a completion queue CQ 1 corresponds to a submission queue SQ 1, and by analogy, a completion queue CQ n corresponds to a submission queue SQ n.

Optionally, the NOF engine 142 further has a data buffer (Data Buffer) corresponding to each communication link. The data buffer is configured to: when network congestion occurs on a communication link, buffer read data that is from the NVMe hard disk 144 and that is corresponding to the communication link. In other words, in this embodiment of this application, not all communication links share a same data buffer, and at least two communication links use respective corresponding data buffers. Optionally, each communication link uses a data buffer corresponding to the communication link, and data buffers corresponding to any two communication links are different. Alternatively, communication links corresponding to a same host use a data buffer corresponding to the host, and data buffers corresponding to any two hosts are different.

The host 120 is connected to the NOF controller 140 by using the network 160, and the network 160 may be congested. Therefore, in a process for reading data from the NOF controller 140 by the host 120, the data may not be normally read due to network congestion. For example, in FIG. 1, access bandwidth of a host 1 is 100 GB. When the host 0 sends data of approximately 100 GB to the host 1, a NOF engine 0 sends data of approximately 100 GB to the host 1, and a NOF engine 1 sends data of approximately 100 GB to the host 1, the access bandwidth of the host 1 cannot support 300 GB data transmission at the same time, causing congestion.

Figure 3:
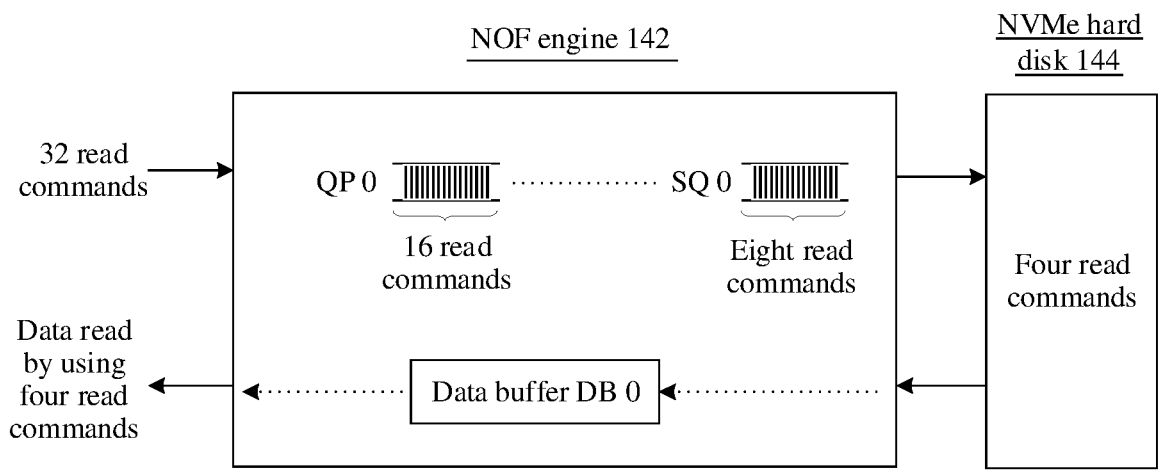
FIG. 3 is a typical schematic principle diagram when a NOF storage system is congested.

FIG. 3 is a typical schematic principle diagram when a NOF storage system is congested. After a NOF engine 142 receives a read command from a host, the read command is transmitted along a transmission path: a completion queue QP 0→a submission queue SQ 0→an NVMe hard disk 144. The NVMe hard disk 144 processes the read command, and feeds back data to the NOF engine 142. It is assumed that the NOF engine 142 receives 32 read commands in total, 16 read commands are buffered in the completion queue QP 0, eight read commands are buffered in the submission queue SQ 0, four read commands are being processed by the NVMe hard disk 144, and four read commands has been processed by the NVMe hard disk 144. For the four read commands that have been processed by the NVMe hard disk 144, data read by using the four read commands is sent by the NOF engine 142 to the host.

If network congestion occurs at this time, data requested by using the 28 read requests that have not been processed may not be successfully fed back to the host. As a result, the 32 read commands sent by the host cannot be correctly responded to.

Figure 4:
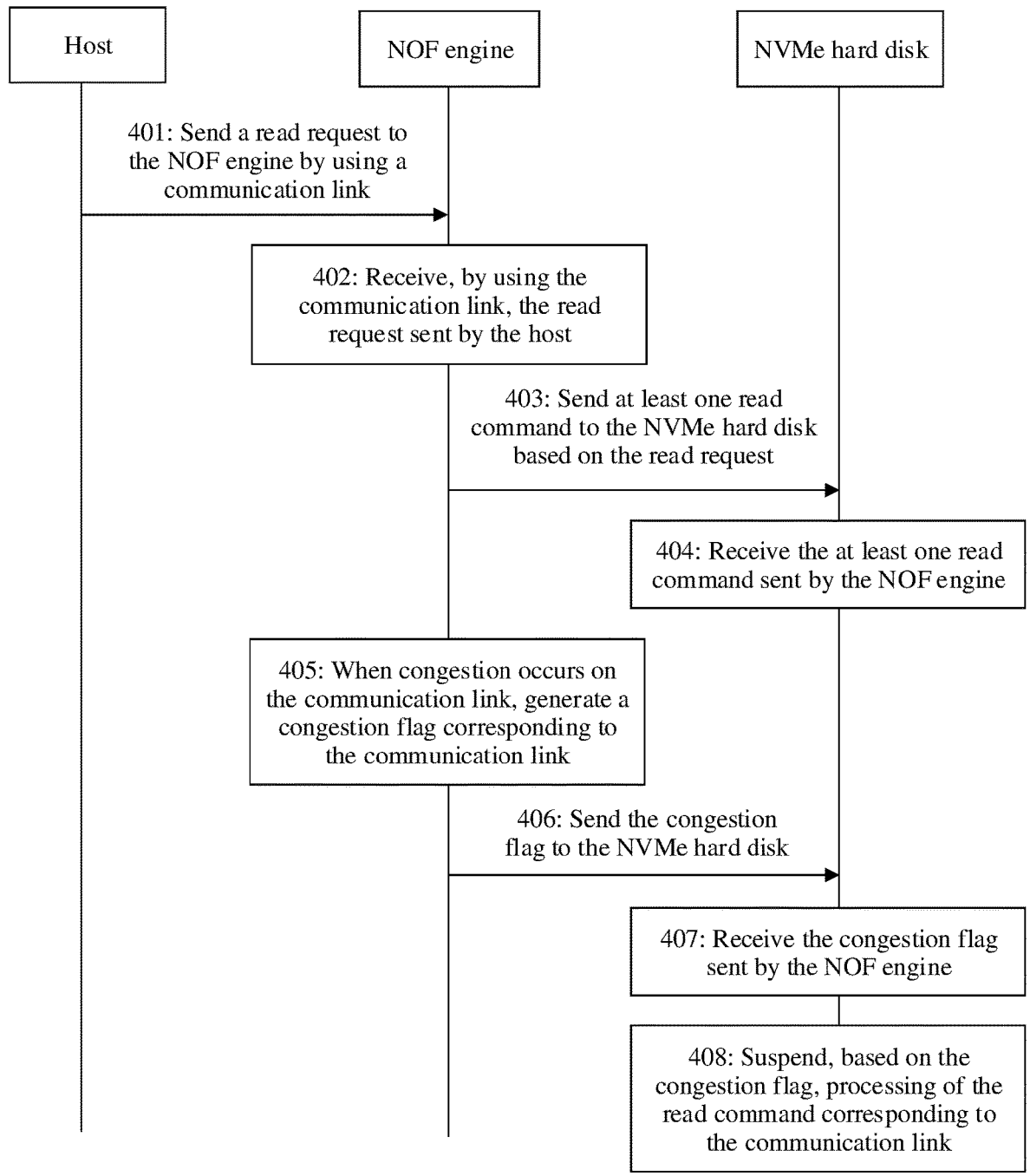
FIG. 4 is a flowchart of a NOF-based read control method according to an example embodiment of this application.

FIG. 4 is a flowchart of a NOF-based read control method according to an example embodiment of this application. This embodiment is described by using an example in which the method is applied to the NOF storage system shown in FIG. 1 or FIG. 2. The method includes the following steps.

Step 401: A host sends a read request to a NOF engine by using a communication link.

The communication link is a communication link between the host and the NOF engine. Optionally, the communication link is a QP connection between the host and the NOF engine. There may be one or more QP connections between one host and one NOF engine.

Optionally, each QP connection has a unique communication link identifier, and the communication link identifier may be denoted as a QPID. One QPID points to one host. A plurality of QPIDs may point to different hosts or a same host.

The host sends the read request to the NOF engine by using the QP connection. The read request may be encapsulated in a form of an RDMA send command message capsule (RDMA_SEND command capsule). The read request carries address information of to-be-read data, an amount of the to-be-read data, and a sequence number (Processing Sequence Number, PSN). The sequence number increases in ascending order based on a sequence of read requests.

Optionally, the host sends one or more read requests.

Step 402: The NOF engine receives, by using the communication link, the read request sent by the host.

The NOF engine buffers the received read request to a completion queue corresponding to the communication link.

Step 403: The NOF engine sends at least one read command to an NVMe hard disk based on the read request.

Optionally, when a relatively small amount of data is requested by using the read request, the NOF engine may convert one read request in the completion queue into one read command, and buffer the read command to a submission queue. When a relatively large amount of data is requested by using the read request, the NOF engine may convert one read request in the completion queue into a plurality of read commands, and buffer the plurality of read commands to a submission queue. For example, an amount of data requested by using the read request is 1 MB, the read request is split into eight read commands, and an amount of data requested by using each read command is 128 KB.

Optionally, the read command has a same PSN as that of the read request.

Step 404: The NVMe hard disk receives the at least one read command sent by the NOF engine.

The NVMe hard disk periodically performs a read operation on the submission queue. When there is an unprocessed read command in the submission queue, the NVMe hard disk reads and processes the read command.

After reading data according to the read command, the NVMe hard disk feeds back a data frame that carries the data and the PSN to the NOF engine. The NOF engine sends the data frame to the host by using the communication link. To be specific, the data frame is used to feed back data corresponding to a processed read command.

Optionally, information exchange between the host and the NOF engine complies with an RDMA protocol.

Step 405: The NOF engine generates a congestion flag corresponding to the communication link when congestion occurs on the communication link.

When correctly receiving the data frame, the host feeds back an acknowledgment (Acknowledgement, ACK) signal with the same PSN to the NOF engine. When the host does not correctly receive the data frame, the host feeds back a non-acknowledgment (Non-Acknowledgement, NACK) signal with the same PSN to the NOF engine. When the host does not receive the data frame, the host does not feed back any signal to the NOF engine. In this case, the NOF engine generates a timer timeout event. The timer is a timer that starts when the NOF engine starts to send the data frame.

According to the RDMA protocol, when the NOF engine receives the NACK of the data frame or does not receive the acknowledgment signal within a timeout period, it is determined that the congestion occurs on the communication link, and the NOF engine generates the congestion flag corresponding to the communication link. The congestion flag may be denoted as FC.

Optionally, the congestion flag may explicitly or implicitly indicate an identifier of the communication link. For example, the congestion flag carries the identifier of the communication link, and the identifier is a QPID.

Step 406: The NOF engine sends the congestion flag to the NVMe hard disk.

The NVMe hard disk may have read some read commands corresponding to the communication link for processing. If the NVMe hard disk continues to process these read commands, the read commands may fail to be processed due to network congestion. Therefore, the NOF engine sends the congestion flag to the NVMe hard disk, and the congestion flag is used to instruct the NVMe hard disk to suspend processing of a read command corresponding to the communication link.

Optionally, the NOF engine suspends receiving of a read request from the communication link.

Step 407: The NVMe hard disk receives the congestion flag sent by the NOF engine.

Step 408: The NVMe hard disk suspends, based on the congestion flag, processing of the read command corresponding to the communication link.

When there is a read command that has been obtained and has not been processed in the NVMe hard disk, processing of the read command corresponding to the communication link is suspended.

In conclusion, according to the NOF-based read control method provided in this embodiment, the NOF engine sends the congestion flag to the NVMe hard disk when the communication link between the NOF engine and the host is congested, and the NVMe hard disk suspends, based on the congestion flag, the processing of the read command corresponding to the communication link. In this way, in a network congestion scenario, the NVMe hard disk suspends processing of a read command that has been obtained and has not been processed. This resolves the following problem: After data of the read command is read, the data cannot be successfully sent to the host due to network congestion, and consequently an entire read process fails. This reduces sending of invalid data in the network congestion scenario, and avoids a more congested network.

Figure 5:
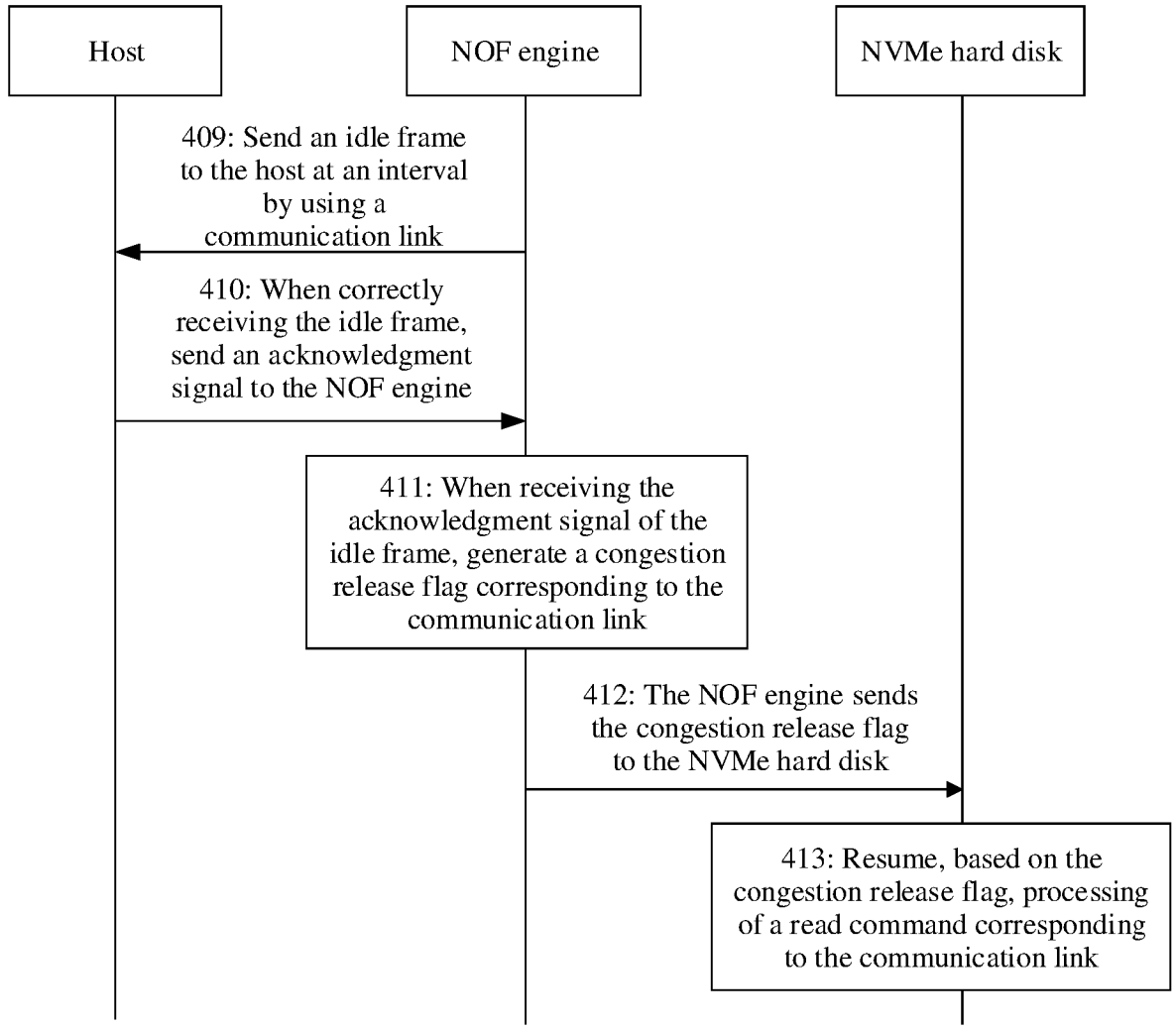
FIG. 5 is a flowchart of a NOF-based read control method according to another example embodiment of this application.

In an optional embodiment based on the embodiment in FIG. 4, the network congestion may be released after a period of time. In this case, the NOF engine may send a congestion release flag to the NVMe hard disk. To be specific, after the step 408, the method may further include the following step 409 to step 413, as shown in FIG. 5.

Step 409: The NOF engine sends an idle frame to the host at an interval by using the communication link.

Optionally, after sending a congestion flag of one communication link, the NOF engine sends an idle frame to the host at a preset time interval by using the communication link. The idle frame is a probe frame that does not include data but includes a sequence number. The sequence number may be any sequence number selected by the NOF engine from sequence numbers that have been used.

Step 410: When correctly receiving the idle frame, the host sends an acknowledgment signal to the NOF engine.

If the network congestion is released and the host can correctly receive the idle frame, the host sends an ACK corresponding to the idle frame to the NOF engine. The ACK carries a sequence number of the idle frame.

Step 411: When receiving the acknowledgment signal of the idle frame, the NOF engine generates a congestion release flag corresponding to the communication link.

Optionally, the congestion release flag may explicitly or implicitly indicate the identifier of the communication link. For example, the congestion release flag carries the identifier of the communication link, and the identifier is the QPID.

Step 412: The NOF engine sends the congestion release flag to the NVMe hard disk.

The congestion release flag is used to instruct the NVMe hard disk to resume the processing of the read command corresponding to the communication link.

Correspondingly, the NVMe hard disk receives the congestion release flag sent by the NOF engine.

Step 413: The NVMe hard disk resumes, based on the congestion release flag, the processing of the read command corresponding to the communication link.

When there is a read command that has been obtained and has not been processed in the NVMe hard disk, processing of the read command corresponding to the communication link is resumed.

In conclusion, according to the NOF-based read control method provided in this embodiment, when the congestion on the communication link is released, the NOF engine sends the congestion release flag to the NVMe hard disk, and the NVMe hard disk resumes, based on the congestion release flag, the processing of the read command corresponding to the communication link. In this way, in a scenario in which the network congestion has been released, the NVMe hard disk resumes the processing of the read command that has been obtained and has not been processed, thereby ensuring a success rate of reading data by the host.

There are a plurality of manners for information exchange between the NOF engine and the NVMe hard disk. Therefore, in the step 406, the NOF engine may send the congestion flag (and/or the congestion release flag) to the NVMe hard disk in any one of the following three different manners:

1. sending an SQE command in the submission queue;
2. sending a register write command; an
3. sending a management (Admin) command.

Figure 6A:
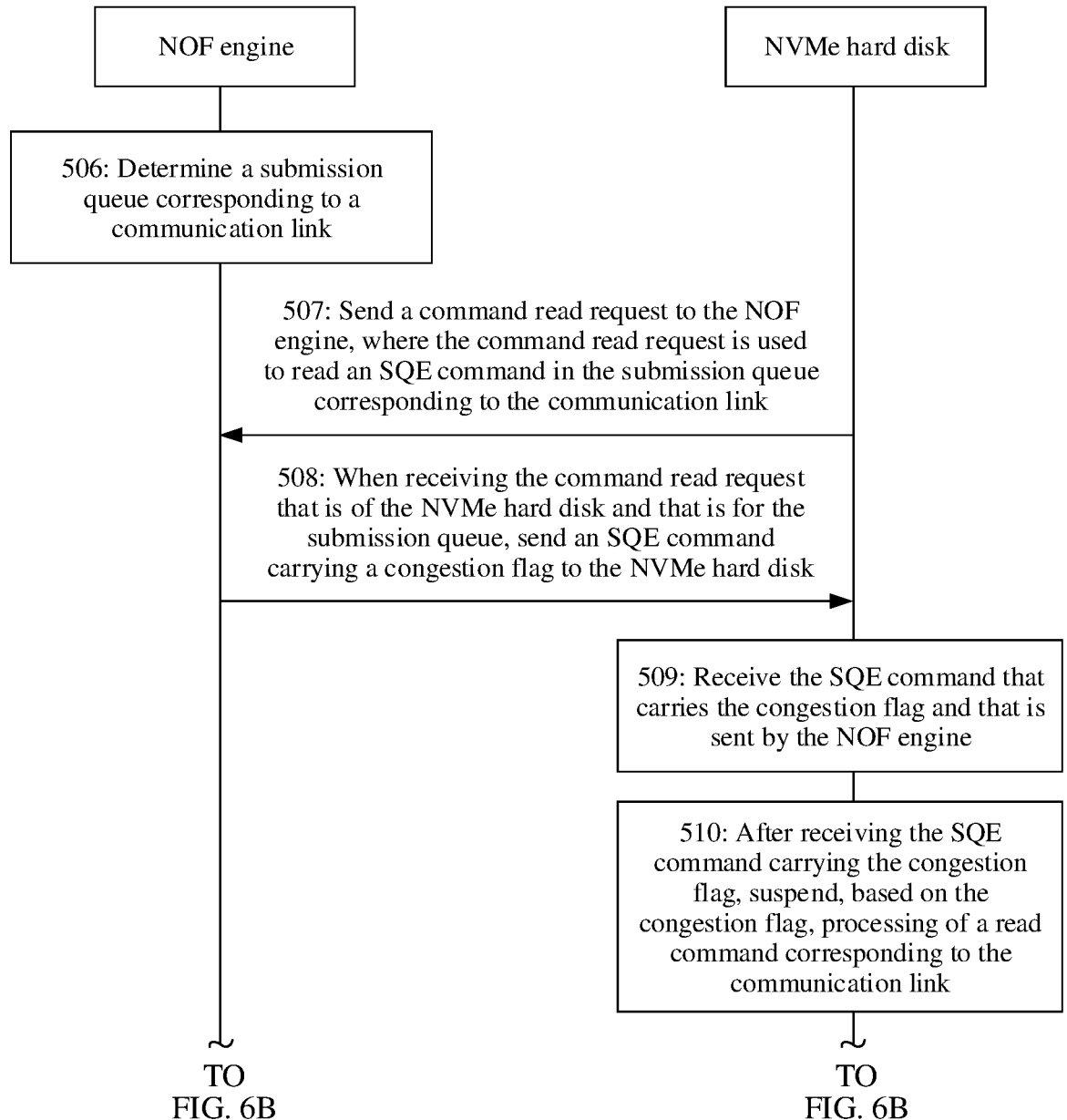
FIGS. 6A and 6B show a flowchart of a NOF-based read control method according to another example embodiment of this application.
Figure 6B:
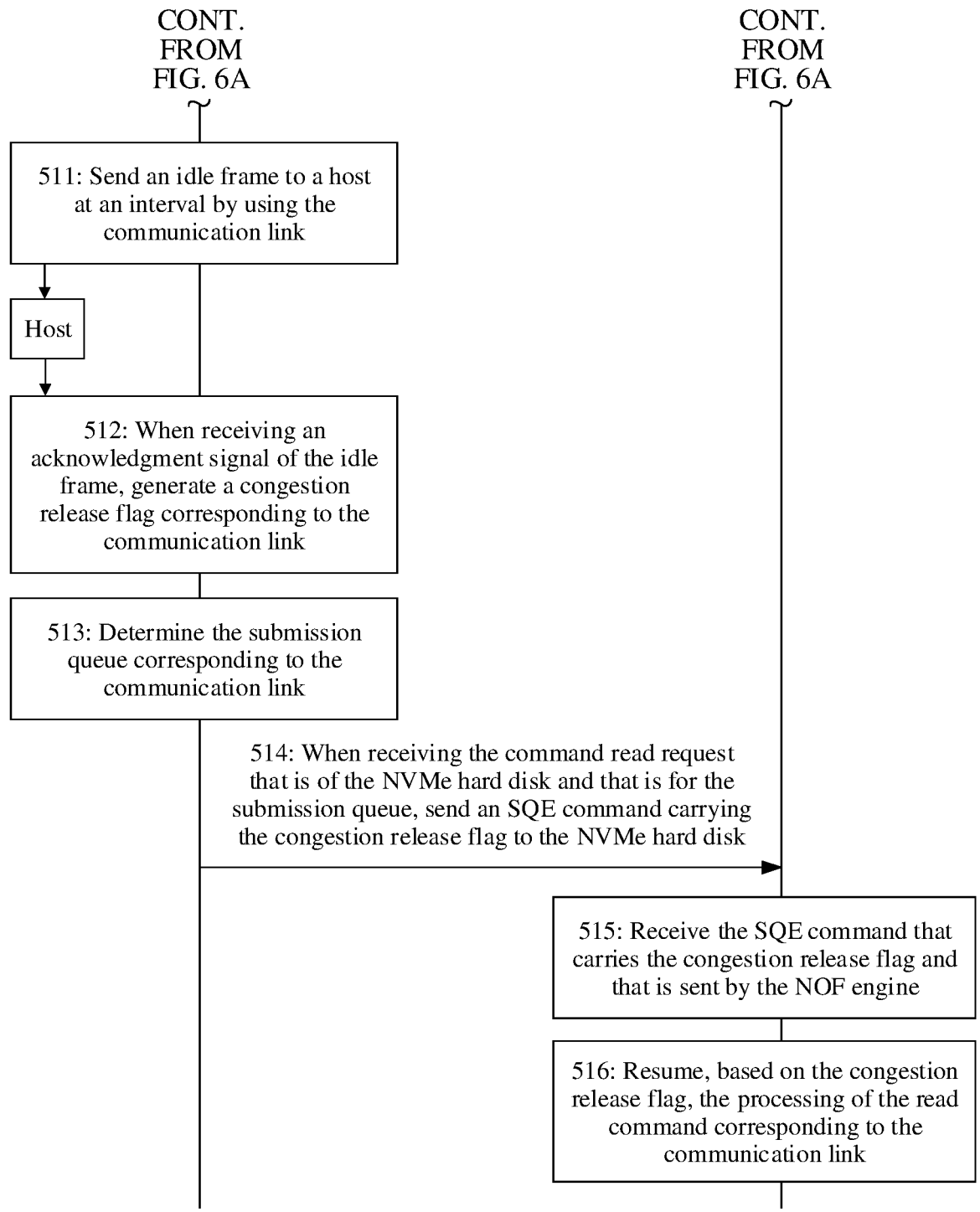

In the first optional implementation, the steps 406 to 413 may be implemented as the following steps, as shown in FIG. 6A and FIG. 6B.

Step 506: The NOF engine determines a submission queue corresponding to the communication link.

The submission queue is used to store an entry (Submission Queue Entry, SQE) SQE command in the submission queue corresponding to the communication link, and the SQE command includes a read command and/or a write command.

The NOF engine stores a correspondence between a communication link and a submission queue. Table 1 schematically shows the correspondence.

TABLE 1

| Communication link | Submission queue |
|---|---|
| QPID 0 | SQ 0 |
| QPID 1 | SQ 1 |
| QPID 2 | SQ 2 |
| QPID 3 | SQ 3 |

For example, when a communication link 0 is congested, the NOF engine can determine, based on the correspondence, a submission queue SQ 0 corresponding to the communication link 0. The SQ 0 is used to store an SQE command corresponding to the communication link 0, and the SQE command includes a read command and/or a write command. Optionally, the SQE command is generated or forwarded by the NOF engine based on a read/write request received on the communication link 0.

Step 507: The NVMe hard disk sends a command read request to the NOF engine, where the command read request is used to read an SQE command in the submission queue corresponding to the communication link.

The NVMe hard disk sends the command read request to the NOF engine at a predetermined time interval, or the NVMe hard disk sends the command read request to the NOF engine when there is an idle processing resource.

The command read request is used to read the SQE command in the submission queue corresponding to the communication link.

It should be noted that the read process is a routine process during normal running of the NVMe hard disk, and the NVMe hard disk does not know in advance which communication link is congested.

Step 508: When receiving the command read request that is of the NVMe hard disk and that is for the submission queue, the NOF engine sends an SQE command carrying the congestion flag to the NVMe hard disk.

For example, assuming that the submission queue corresponding to the communication link 0 is the SQ 0, when receiving a command read request that is of the NVMe hard disk and that is for the SQ 0, the NOF engine sends an SQE command carrying the congestion flag to the NVMe hard disk.

Optionally, this step has two cases:
1. When there is a to-be-processed SQE command in the submission queue, after adding the congestion flag to a reserved field (Reserved) of the to-be-processed SQE command, the NOF engine sends the SQE command carrying the congestion flag to the NVMe hard disk.
2. When there is no to-be-processed SQE command in the submission queue, in other words, the submission queue is empty, the NOF engine generates an SQE command (briefly referred to as a null command) that carries the congestion flag and that is not used to perform an actual read/write operation, and sends the null command carrying the congestion flag to the NVMe hard disk.

Step 509: The NVMe hard disk receives the SQE command that carries the congestion flag and that is sent by the NOF engine.

Step 510: After receiving the SQE command carrying the congestion flag, the NVMe hard disk suspends, based on the congestion flag, processing of the read command corresponding to the communication link.

For the submission queue corresponding to the congested communication link, the NVMe hard disk performs at least one of the following operations based on the congestion flag:

1. Suspending the command read request for the submission queue

The NVMe hard disk suspends a process of periodically reading a command from the submission queue, to reduce redundant reading by the NVMe hard disk.

2. Setting a read command that has been retrieved from the submission queue and has not been completed to a suspended state The NVMe hard disk does not process the read command that has been retrieved from the submission queue and has not been completed. The read command is set to the suspended state.

3. Decreasing a scheduling weight corresponding to the submission queue to a first weight The NVMe hard disk may set a scheduling weight (also referred to as a scheduling priority) for each submission queue. The first weight may be a lowest scheduling weight or a lower scheduling weight.

Optionally, when the communication link corresponding to the submission queue is congested, the NVMe hard disk decreases the scheduling weight corresponding to the submission queue to the lowest scheduling weight. Therefore, an SQE command corresponding to another submission queue is preferentially scheduled.

This embodiment is described by using an example in which the NOF engine performs all the three operations.

Step 511: The NOF engine sends an idle frame to the host at an interval by using the communication link.

For example, after the communication link 0 is congested, the NOF engine may send an idle frame to the host at a predefined time interval by using the communication link 0. The idle frame is a probe frame that does not include data but includes a sequence number. The sequence number may be a sequence number customized by the NOF engine, or may be a sequence number of a latest signal with no acknowledgment signal received.

Step 512: When receiving an acknowledgment signal of the idle frame, the NOF engine generates a congestion release flag corresponding to the communication link.

If the network congestion is released and the host can correctly receive the idle frame, the host sends an ACK corresponding to the idle frame to the NOF engine. The ACK carries a sequence number of the idle frame.

When receiving the acknowledgment signal of the idle frame, the NOF engine generates the congestion release flag corresponding to the communication link. Optionally, the congestion release flag may explicitly or implicitly indicate an identifier of the communication link. For example, the congestion release flag carries the identifier of the communication link, and the identifier is a QPID. For another example, the NOF engine implicitly indicates the communication link to the NVMe hard disk by using an identifier of the submission queue corresponding to the communication link.

Step 513: The NOF engine determines the submission queue corresponding to the communication link, where the submission queue is used to store the SQE command corresponding to the communication link.

For details about this step, refer to the step 506.

Step 514: When receiving the command read request that is of the NVMe hard disk and that is for the submission queue, the NOF engine sends an SQE command carrying the congestion release flag to the NVMe hard disk.

For example, assuming that the submission queue corresponding to the communication link 0 is the SQ 0, because the NVMe hard disk has stopped reading the submission queue, the NOF engine may actively send an SQE command carrying the congestion release flag to the NVMe hard disk.

Optionally, this step has two cases:

When there is a to-be-processed SQE command in the submission queue, after adding the congestion release flag to a reserved field (Reserved) of the to-be-processed SQE command, the NOF engine sends the SQE command carrying the congestion release flag to the NVMe hard disk.

When there is no to-be-processed SQE command in the submission queue, in other words, the submission queue is empty, the NOF engine generates an SQE command (briefly referred to as a null command) that carries the congestion release flag and that is not used to perform an actual read/write operation, and sends the null command carrying the congestion release flag to the NVMe hard disk.

Step 515: The NVMe hard disk receives the SQE command that carries the congestion release flag and that is sent by the NOF engine.

Step 516: The NVMe hard disk resumes, based on the congestion release flag, the processing of the read command corresponding to the communication link.

For the submission queue corresponding to the communication link on which the congestion has been released, the NVMe hard disk performs at least one of the following operations based on the congestion release flag:

1. Resuming the command read request for the submission queue

The NVMe hard disk resumes the process of periodically reading a command from the submission queue, to continue processing of the SQE command in the submission queue.

2. Switching the read command that has been retrieved from the submission queue and has not been completed from the suspended state to an execution state The NVMe hard disk also switches the read command that has been retrieved from the submission queue and has not been completed from the suspended state to the execution state.

3. Increasing the scheduling weight corresponding to the submission queue to a second weight The NVMe hard disk may set a scheduling weight (also referred to as a scheduling priority) for each submission queue. The second weight may be a weight of the submission queue before the submission queue is adjusted to the first weight, or the second weight is a preset highest weight or higher weight. In other words, the second weight is higher than the first weight.

Optionally, when the congestion on the communication link corresponding to the submission queue is released, the NVMe hard disk increases the scheduling weight corresponding to the submission queue to the second weight. Therefore, the SQE command corresponding to the submission queue is preferentially scheduled or continues to be scheduled.

In conclusion, according to the read control method provided in this embodiment, the congestion flag is transferred by using the SQE command in the submission queue. Therefore, a congestion notification mechanism between the NOF engine and the NVMe hard disk is implemented without adding additional signaling as much as possible, and the NVMe hard disk is further controlled to suspend the processing of the read command corresponding to the communication link. There is a high probability that an SQE command that has not been read by the NVMe hard disk exists in the submission queue. A reserved field in the SQE command is used to transfer the congestion flag, with almost no additional signaling or data amount.

According to the read control method provided in this embodiment, the congestion release flag is transferred by using the SQE command in the submission queue. Therefore, a congestion release notification mechanism between the NOF engine and the NVMe hard disk is implemented without adding additional signaling as much as possible, and the NVMe hard disk is further controlled to suspend the processing of the read command corresponding to the communication link. There is a high probability that an SQE command that has not been read by the NVMe hard disk exists in the submission queue. A reserved field in the SQE command is used to transfer the congestion release flag, with almost no additional signaling or data amount.

Figure 7A:
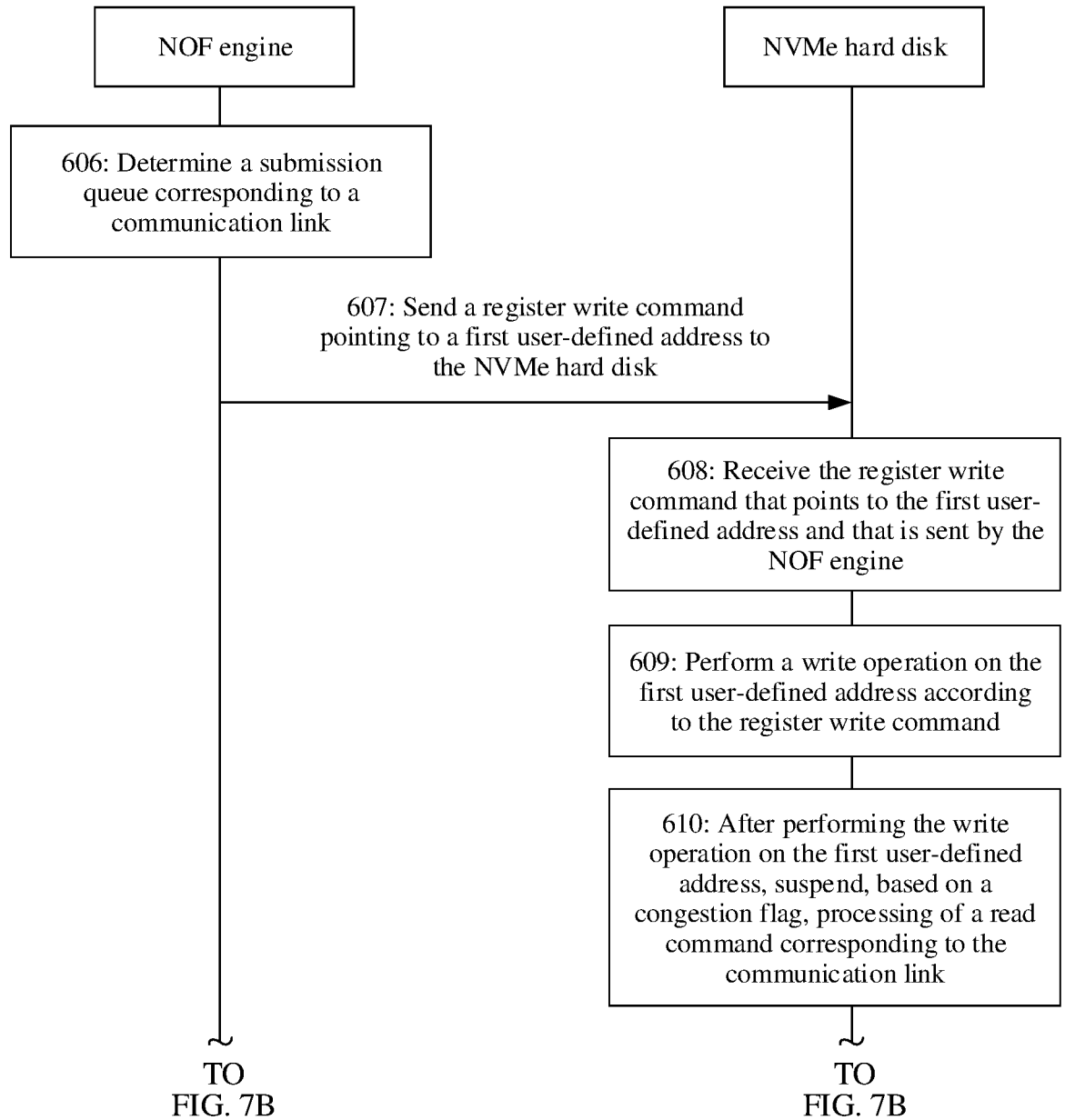
Figure 7B:
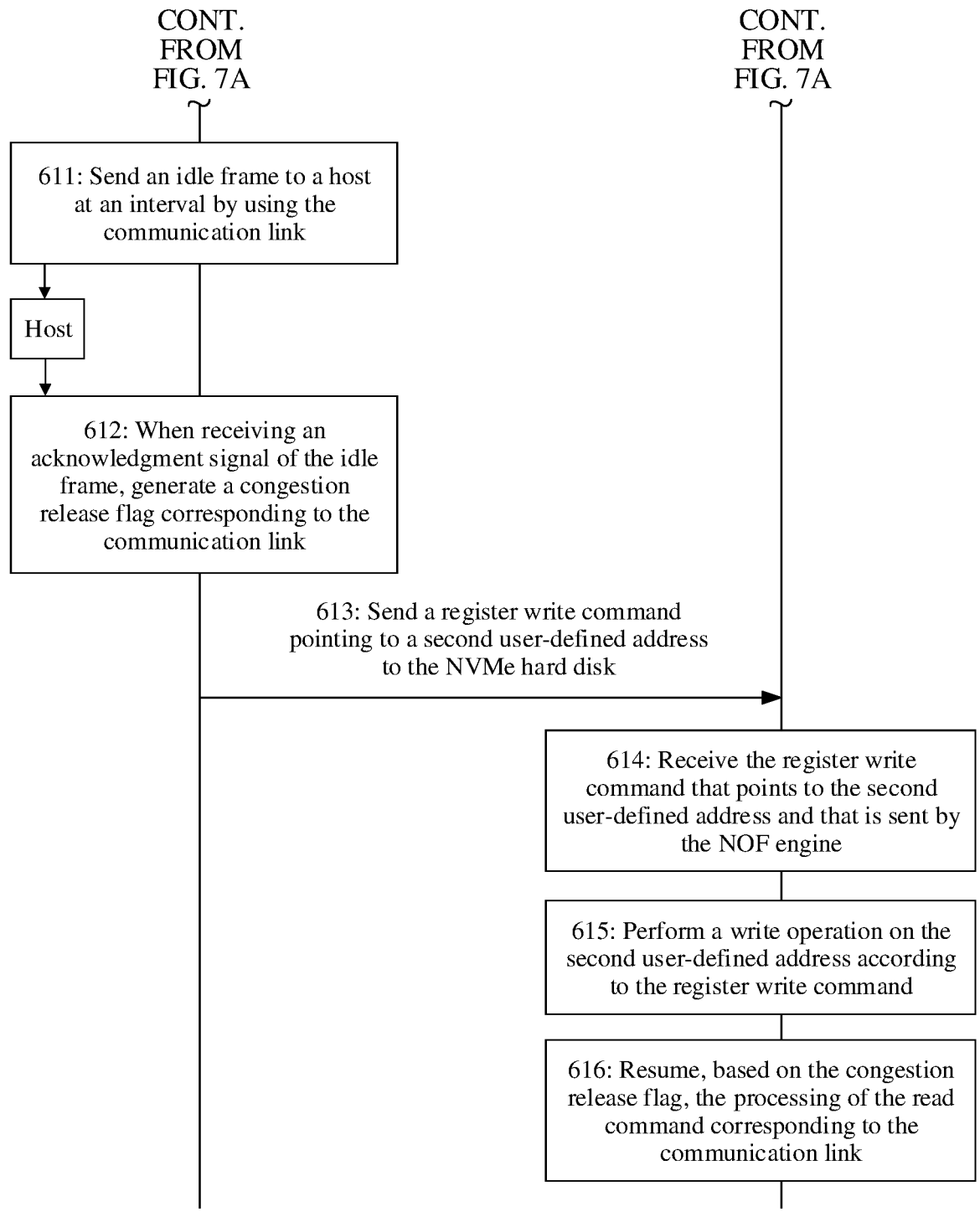

In the second optional implementation, the steps 406 to 413 may be implemented as the following steps, as shown in FIG. 7A and FIG. 7B.

Step 606: The NOF engine determines the submission queue corresponding to the communication link, where the submission queue is used to store an SQE command corresponding to the communication link, and the SQE command includes a read command and/or a write command.

The NOF engine stores a correspondence between a communication link and a submission queue. For example, when a communication link 0 is congested, the NOF engine can determine, based on the correspondence, a submission queue SQ 0 corresponding to the communication link 0. The SQ 0 is used to store an SQE command corresponding to the communication link 0, and the SQE command includes a read command and/or a write command. Optionally, the SQE command is generated or forwarded by the NOF engine based on a read/write request received on the communication link 0.

Step 607: The NOF engine sends a register write command pointing to a first user-defined address to the NVMe hard disk, where the first user-defined address is an address used to store the congestion flag, and the register write command carries an identifier of the submission queue and the congestion flag.

For example, assuming that the submission queue corresponding to the communication link 0 is the SQ 0, the NOF engine sends a register write command pointing to the first user-defined address to the NVMe hard disk. The first user-defined address is the address used to store the congestion flag, and the first user-defined address is a storage address in a register of the NVMe hard disk. The register write command carries the identifier of the submission queue and the congestion flag. Each submission queue may have a respective first user-defined address, or a plurality of submission queues may share a same first user-defined address.

To be specific, the first user-defined address is a register address preset by the NOF engine and the NVMe hard disk, and is located in the NVMe hard disk. The first user-defined address is used to store the congestion flag.

Step 608: The NVMe hard disk receives the register write command that points to the first user-defined address and that is sent by the NOF engine.

Step 609: The NVMe hard disk performs a write operation on the first user-defined address according to the register write command.

The NVMe hard disk writes the identifier of the submission queue and the congestion flag into the first user-defined address according to the register write command. Then, the NVMe hard disk can learn, based on the identifier of the submission queue and the congestion flag, that the communication link corresponding to the submission queue is already congested.

It should be noted that, when a plurality of submission queues share a same first user-defined address, if the NVMe hard disk needs to write an $i^{th}$ register write command pointing to the first user-defined address, where 2, the NVMe hard disk may erase existing data in the first user-defined address, and then perform a write operation according to the $i^{th}$ register write command pointing to the first user-defined address, to prevent the write process from being affected by the existing data.

Step 610: After performing the write operation on the first user-defined address, the NVMe hard disk suspends, based on the congestion flag, processing of the read command corresponding to the communication link.

For the submission queue corresponding to the congested communication link, the NVMe hard disk performs at least one of the following operations based on the congestion flag:

1. Suspending a command read request for the submission queue

The NVMe hard disk suspends a process of periodically reading a command from the submission queue, to reduce redundant reading by the NVMe hard disk.

2. Setting a read command that has been retrieved from the submission queue and has not been completed to a suspended state The NVMe hard disk does not process the read command that has been retrieved from the submission queue and has not been completed. The read command is set to the suspended state.

3. Decreasing a scheduling weight corresponding to the submission queue to a first weight The NVMe hard disk may set a scheduling weight (also referred to as a scheduling priority) for each submission queue. The first weight may be a lowest scheduling weight or a lower scheduling weight.

Optionally, when the communication link corresponding to the submission queue is congested, the NVMe hard disk decreases the scheduling weight corresponding to the submission queue to the lowest scheduling weight. Therefore, an SQE command corresponding to another submission queue is preferentially scheduled.

This embodiment is described by using an example in which the NOF engine performs all the three operations.

Step 611: The NOF engine sends an idle frame to the host at an interval by using the communication link.

For example, after the communication link 0 is congested, the NOF engine may send an idle frame to the host at a predefined time interval by using the communication link 0.

The idle frame is a probe frame that does not include data but includes a sequence number. The sequence number may be a sequence number customized by the NOF engine, or may be a sequence number of a latest signal with no acknowledgment signal received.

Step 612: When receiving an acknowledgment signal of the idle frame, the NOF engine generates a congestion release flag corresponding to the communication link.

If the network congestion is released and the host can correctly receive the idle frame, the host sends an ACK corresponding to the idle frame to the NOF engine. The ACK carries a sequence number of the idle frame.

When receiving the acknowledgment signal of the idle frame, the NOF engine generates the congestion release flag corresponding to the communication link. Optionally, the congestion release flag may explicitly or implicitly indicate an identifier of the communication link. For example, the congestion flag carries the identifier of the communication link, and the identifier is a QPID. For another example, the NOF engine implicitly indicates the communication link to the NVMe hard disk by using the identifier of the submission queue corresponding to the communication link.

Step 613: The NOF engine sends a register write command pointing to a second user-defined address to the NVMe hard disk.

The second user-defined address is an address used to store the congestion release flag, and the register write command carries the identifier of the submission queue and the congestion release flag. Optionally, the second user-defined address and the first user-defined address are the same or are different. Each submission queue may have a respective second user-defined address, or a plurality of submission queues may share a same second user-defined address.

For example, assuming that the submission queue corresponding to the communication link 0 is the SQ 0, the NOF engine may actively send a register write command pointing to the second user-defined address to the NVMe hard disk.

Step 614: The NVMe hard disk receives the register write command that points to the second user-defined address and that is sent by the NOF engine.

Step 615: The NVMe hard disk performs a write operation on the second user-defined address according to the register write command.

The NVMe hard disk writes the identifier of the submission queue and the congestion release flag into the second user-defined address according to the register write command. Then, the NVMe hard disk can learn, based on the identifier of the submission queue and the congestion release flag, that the congestion on the communication link corresponding to the submission queue has been released.

It should be noted that, when a plurality of submission queues share a same second user-defined address, if the NVMe hard disk needs to write an $i^{th}$ register write command pointing to the second user-defined address, where 12, the NVMe hard disk may erase existing data in the second user-defined address, and then perform a write operation according to the $i^{th}$ register write command pointing to the second user-defined address, to prevent the write process from being affected by the existing data.

Likewise, in a scenario in which the first user-defined address and the second user-defined address are the same, if the NVMe hard disk needs to write an $i^{th}$ register write command pointing to the second user-defined address, where $i \geq 2$, the NVMe hard disk may also erase existing data in the second user-defined address, and then perform a write operation according to the $i^{th}$ register write command pointing to the second user-defined address, to prevent the write process from being affected by the existing data.

Step 616: The NVMe hard disk resumes, based on the congestion release flag, the processing of the read command corresponding to the communication link.

For the submission queue corresponding to the communication link on which the congestion has been released, the NVMe hard disk performs at least one of the following operations based on the congestion release flag:

1. Resuming the command read request for the submission queue

The NVMe hard disk resumes the process of periodically reading a command from the submission queue, to continue processing of the SQE command in the submission queue.

2. Switching the read command that has been retrieved from the submission queue and has not been completed from the suspended state to an execution state The NVMe hard disk also switches the read command that has been retrieved from the submission queue and has not been completed from the suspended state to the execution state.

3. Increasing the scheduling weight corresponding to the submission queue to a second weight The NVMe hard disk may set a scheduling weight (also referred to as a scheduling priority) for each submission queue. The second weight may be a weight of the submission queue before the submission queue is adjusted to the first weight, or the second weight is a preset highest weight or higher weight. In other words, the second weight is higher than the first weight.

Optionally, when the congestion on the communication link corresponding to the submission queue is released, the NVMe hard disk increases the scheduling weight corresponding to the submission queue to the second weight. Therefore, the SQE command corresponding to the submission queue is preferentially scheduled or continues to be scheduled.

In conclusion, according to the read control method provided in this embodiment, the congestion flag is transferred by using the register write command pointing to the first user-defined address. Therefore, a congestion notification mechanism between the NOF engine and the NVMe hard disk can be implemented without changing a normal read/write mechanism of the SQE command, and the NVMe hard disk is further controlled to suspend the processing of the read command corresponding to the communication link.

According to the read control method provided in this embodiment, the congestion release flag is transferred by using the register write command pointing to the second user-defined address. Therefore, a congestion release notification mechanism between the NOF engine and the NVMe hard disk is implemented without changing a normal read/write mechanism of the SQE command, and the NVMe hard disk is further controlled to resume the processing of the read command corresponding to the communication link.

Figure 8:
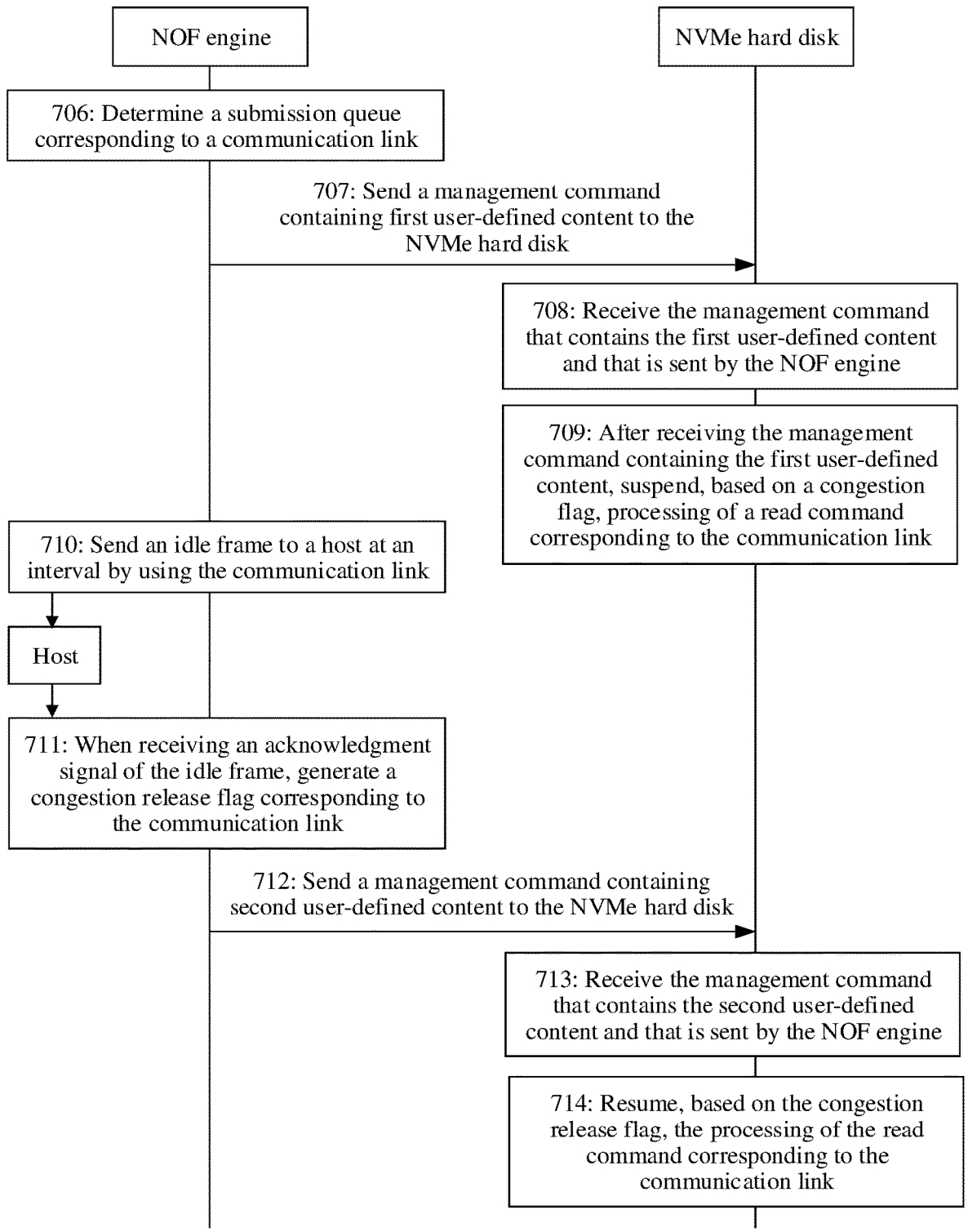
FIG. 8 is a flowchart of a NOF-based read control method according to another example embodiment of this application.

In the third optional implementation, the steps 406 to 413 may be implemented as the following steps, as shown in FIG. 8.

Step 706: The NOF engine determines the submission queue corresponding to the communication link, where the submission queue is used to store an entry (Submission Queue Entry, SQE) SQE command in the submission queue corresponding to the communication link, and the SQE command includes a read command and/or a write command.

The NOF engine stores a correspondence between a communication link and a submission queue. For example, when a communication link 0 is congested, the NOF engine can determine, based on the correspondence, a submission queue SQ 0 corresponding to the communication link 0. The SQ 0 is used to store an SQE command corresponding to the communication link 0, and the SQE command includes a read command and/or a write command. Optionally, the SQE command is generated or forwarded by the NOF engine based on a read/write request received on the communication link 0.

Step 707: The NOF engine sends a management command containing first user-defined content to the NVMe hard disk, where the first user-defined content carries an identifier of the submission queue and the congestion flag.

For example, assuming that the submission queue corresponding to the communication link 0 is the SQ 0, the NOF engine sends a management command containing the first user-defined content to the NVMe hard disk. The first user-defined content carries the identifier of the submission queue and the congestion flag.

Step 708: The NVMe hard disk receives the management command that contains the first user-defined content and that is sent by the NOF engine, where the first user-defined content carries the identifier of the submission queue and the congestion flag.

Step 709: After receiving the management command containing the first user-defined content, the NVMe hard disk suspends, based on the congestion flag, processing of the read command corresponding to the communication link.

Optionally, the NVMe hard disk obtains the identifier of the submission queue and the congestion flag from the management command through parsing.

For the submission queue corresponding to the congested communication link, the NVMe hard disk performs at least one of the following operations based on the congestion flag:

1. Suspending a command read request for the submission queue

The NVMe hard disk suspends a process of periodically reading a command from the submission queue, to reduce redundant reading by the NVMe hard disk.

2. Setting a read command that has been retrieved from the submission queue and has not been completed to a suspended state The NVMe hard disk does not process the read command that has been retrieved from the submission queue and has not been completed. The read command is set to the suspended state.

3. Decreasing a scheduling weight corresponding to the submission queue to a first weight The NVMe hard disk may set a scheduling weight (also referred to as a scheduling priority) for each submission queue. The first weight may be a lowest scheduling weight or a lower scheduling weight.

Optionally, when the communication link corresponding to the submission queue is congested, the NVMe hard disk decreases the scheduling weight corresponding to the submission queue to the lowest scheduling weight. Therefore, an SQE command corresponding to another submission queue is preferentially scheduled.

This embodiment is described by using an example in which the NOF engine performs all the three operations.

Step 710: The NOF engine sends an idle frame to the host at an interval by using the communication link.

For example, after the communication link 0 is congested, the NOF engine may send an idle frame to the host at a predefined time interval by using the communication link 0. The idle frame is a probe frame that does not include data but includes a sequence number. The sequence number may be a sequence number customized by the NOF engine, or may be a sequence number of a latest signal with no acknowledgment signal received.

Step vii: When receiving an acknowledgment signal of the idle frame, the NOF engine generates a congestion release flag corresponding to the communication link.

If the network congestion is released and the host can correctly receive the idle frame, the host sends an ACK corresponding to the idle frame to the NOF engine. The ACK carries a sequence number of the idle frame.

When receiving the acknowledgment signal of the idle frame, the NOF engine generates the congestion release flag corresponding to the communication link. Optionally, the congestion release flag may explicitly or implicitly indicate an identifier of the communication link. For example, the congestion release flag carries the identifier of the communication link, and the identifier is a QPID. For another example, the NOF engine implicitly indicates the communication link to the NVMe hard disk by using the identifier of the submission queue corresponding to the communication link.

Step 712: The NOF engine sends a management command containing second user-defined content to the NVMe hard disk.

The second user-defined content is an address used to store the congestion release flag, and the management command carries the identifier of the submission queue and the congestion release flag. Optionally, the second user-defined content and the first user-defined content are the same or are different. Each submission queue may have a respective second user-defined content, or a plurality of submission queues may share a same second user-defined content.

For example, assuming that the submission queue corresponding to the communication link 0 is the SQ 0, the NOF engine may actively send a management command containing the second user-defined content to the NVMe hard disk.

Step 713: The NVMe hard disk receives the management command that contains the second user-defined content and that is sent by the NOF engine.

Step 714: The NVMe hard disk resumes, based on the congestion release flag, the processing of the read command corresponding to the communication link.

For the submission queue corresponding to the communication link on which the congestion has been released, the NVMe hard disk performs at least one of the following operations based on the congestion release flag:

1. Resuming the command read request for the submission queue

The NVMe hard disk resumes the process of periodically reading a command from the submission queue, to continue processing of the SQE command in the submission queue.

2. Switching the read command that has been retrieved from the submission queue and has not been completed from the suspended state to an execution state The NVMe hard disk also switches the read command that has been retrieved from the submission queue and has not been completed from the suspended state to the execution state.

3. Increasing the scheduling weight corresponding to the submission queue to a second weight The NVMe hard disk may set a scheduling weight (also referred to as a scheduling priority) for each submission queue. The second weight may be a weight of the submission queue before the submission queue is adjusted to the first weight, or the second weight is a preset highest weight or higher weight. In other words, the second weight is higher than the first weight.

Optionally, when the congestion on the communication link corresponding to the submission queue is released, the NVMe hard disk increases the scheduling weight corresponding to the submission queue to the second weight. Therefore, the SQE command corresponding to the submission queue is preferentially scheduled or continues to be scheduled.

In conclusion, according to the read control method provided in this embodiment, the congestion flag is transferred by using the management command containing the first user-defined content. Therefore, a congestion notification mechanism between the NOF engine and the NVMe hard disk can be implemented by using the management command provided by an NVMe protocol, and the NVMe hard disk is further controlled to suspend the processing of the read command corresponding to the communication link.

According to the read control method provided in this embodiment, the congestion release flag is transferred by using the management command containing the second user-defined content. Therefore, a congestion release notification mechanism between the NOF engine and the NVMe hard disk can be implemented by using the management command provided by the NVMe protocol, and the NVMe hard disk is further controlled to resume the processing of the read command corresponding to the communication link.

The foregoing three embodiments may be applicable to a scenario in which there is no data buffer in the NOF engine 142, and may also be applicable to a scenario in which a data buffer is configured in the NOF engine 142. Optionally, for the scenario in which there is a data buffer in the NOF engine 142, the following embodiment may be further provided.

Figure 9:
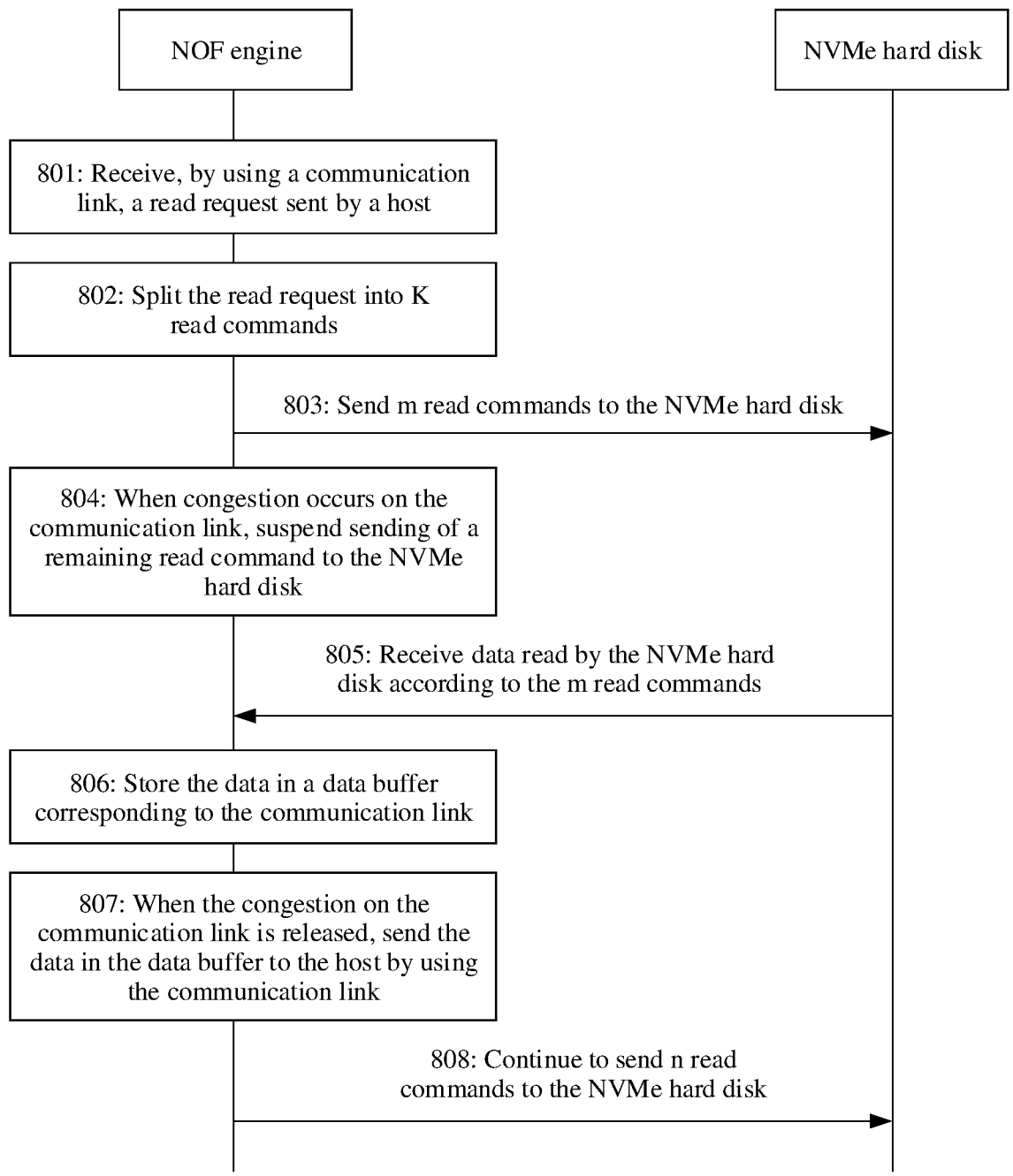
FIG. 9 is a flowchart of a NOF-based read control method according to another example embodiment of this application.

FIG. 9 is a flowchart of a NOF-based read control method according to an example embodiment of this application. This embodiment is described by using an example in which the method is applied to the NOF storage system shown in FIG. 1 or FIG. 2. It is assumed that a data buffer is disposed in a NOF engine 142, a size of the data buffer is n MB, and a quantity of communication links supported by the NOF engine 142 is m. A size of a data buffer allocated to each communication link is 1/m of the total size n. The method includes the following steps.

Step 801: The NOF engine receives, by using a communication link, a read request sent by a host, where the read request is used to request to read data of a first data amount, and the first data amount exceeds the size of the data buffer.

For example, it is assumed that the size n of the data buffer disposed in the NOF engine 142 is 1024 MB and the quantity m of QP connections supported by the NOF engine 142 is 1024. A data buffer allocated to each QP connection has data buffer space of 1 MB=1024 KB.

The host sends the read request to the NOF engine by using the communication link. Optionally, the read request is used to read the data of the first data amount, and the first data amount exceeds a size of a data buffer corresponding to the communication link. For example, the first data amount exceeds 1 MB.

Optionally, the host sends the read request to the NOF engine by using an RDMA protocol, and the NOF engine receives, by using the RDMA protocol, the read request sent by the host.

Step 802: The NOF engine splits the read request into K read commands.

The NOF engine splits the read request corresponding to the first data amount into the K read commands corresponding to a second data amount. Each read command is used to request to read data of the second data amount, and the second data amount is less than the first data amount. Optionally, second data amounts corresponding to all the read commands are the same, or second data amounts corresponding to at least two read commands are different. The second data amount may be customized.

For example, the NOF engine splits a 2 MB read request into sixteen 128 KB read commands.

Step 803: The NOF engine sends m read commands to an NVMe hard disk, where m≤K, and a product of m and the second data amount is not greater than the size of the data buffer.

The NOF engine controls a quantity of read commands sent to the NVMe hard disk, so that a read data amount corresponding to a read command being processed by the NVMe hard disk does not exceed the size of the data buffer.

For example, because the data size of each QP connection is 1024 KB, a quantity of read commands sent by the NOF engine to the NVMe hard disk each time does not exceed 8, and 8×128 KB=1024 KB.

Optionally, the NOF engine buffers, in a submission queue, a read command that needs to be sent to the NVMe hard disk, and the NVMe hard disk reads the read command. The NOF engine first buffers, in a local completion queue, a read command that temporarily does not need to be sent to the NVMe hard disk, and temporarily does not send the read command to the submission queue.

After the NVMe hard disk feeds back read data to the NOF engine according to the read command, the NOF engine first buffers the read data, and then sends the data to the host in a form of a data frame.

Step 804: When congestion occurs on the communication link, the NOF engine suspends sending of a remaining read command to the NVMe hard disk.

When the NOF engine receives a negative acknowledgment signal of the data frame, or does not receive an acknowledgment signal of the data frame within a timeout period, it is determined that the network congestion occurs on the communication link. For the process, refer to related description details of the step 405. Details are not described again in this embodiment.

In this case, the NOF engine suspends sending of the remaining read command to the NVMe hard disk. Because a quantity of read commands that have been sent to the NVMe hard disk is limited, even if the NVMe hard disk processes and responds to the received read command, the data buffer on the NOF engine side can buffer the read data, and no buffer overflow is caused.

It should be noted that the NVMe hard disk side is completely unaware of the network congestion process.

Step 805: The NOF engine receives data read by the NVMe hard disk according to the m read commands.

During the network congestion, the NVMe hard disk may continue to process a read command corresponding to the communication link, and the NOF engine normally receives data read by the NVMe hard disk according to n read commands.

Step 806: The NOF engine stores the data in the data buffer corresponding to the communication link.

The NOF engine may store the data in the data buffer corresponding to the communication link, and temporarily does not send the data to the host.

Step 807: When the congestion on the communication link is released, the NOF engine sends the data in the data buffer to the host by using the communication link.

Optionally, after sending a congestion flag of a communication link, the NOF engine sends an idle frame to the host at a predefined time interval by using the communication link. The idle frame is a probe frame that does not include data but includes a sequence number. The sequence number may be a sequence number customized by the NOF engine, or may be a sequence number of a latest signal with no acknowledgment signal received. If the network congestion is released and the host can correctly receive the idle frame, the host sends an ACK corresponding to the idle frame to the NOF engine. The ACK carries a sequence number of the idle frame.

When the congestion on the communication link is released, the NOF engine sends the data in the data buffer to the host by using the communication link.

It should be noted that the NVMe hard disk side is not aware of the network congestion release process either.

Step 808: The NOF engine continues to send the n read commands to the NVMe hard disk, where n≤K−m, and a product of n and the second data amount is not greater than the size of the data buffer.

When there is a to-be-processed read command corresponding to the communication link, the NOF engine continues to send the subsequent n read commands to the NVMe hard disk. A read data amount corresponding to the n read commands sent to the NVMe hard disk in each batch does not exceed the size of the data buffer corresponding to the communication link.

In conclusion, according to the NOF-based read control method provided in this embodiment, when there is a data buffer on the NOF engine side, the NOF engine controls a quantity of read commands sent to the NVMe hard disk. Therefore, an amount of data read by using a read command being processed by the NVMe hard disk does not exceed a size of the data buffer. Even if the network congestion occurs on the communication link, the NOF engine suspends delivering of a read command to the NVMe hard disk to resolve the congestion problem. The NVMe hard disk does not need to sense the congestion process. This reduces signaling interaction and occupation of transmission bandwidth between the NOF engine and the NVMe hard disk.

In addition, in this embodiment, a respective data buffer is disposed for each communication link, and a plurality of communication links do not share a same data buffer. Therefore, even if network congestion occurs on a communication link, and a data buffer corresponding to the communication link is occupied, not all data buffers in the NOF engine are occupied by read data corresponding to the communication link, and therefore a reading process of another communication link is not affected. In this way, all communication links are independent of each other. Even if one or more communication links are congested, a normal receiving and sending process of a remaining communication link is not affected.

According to the NOF-based read control method provided in this embodiment, after the congestion on the communication link is released, the NOF engine may further continue to deliver a read command to the NVMe hard disk to restore a normal processing procedure, and the NVMe hard disk does not need to sense the congestion release process. This reduces signaling interaction and occupation of transmission bandwidth between the NOF engine and the NVMe hard disk.

It should be noted that, in the foregoing method embodiments, how to process a read command of a communication link when network congestion or congestion release occurs on the communication link is used as an example for description. However, actually there may be more than one congested communication link, which is easily understood by a person skilled in the art after reading the foregoing embodiments, and is not described in detail in this specification.

Figure 10:
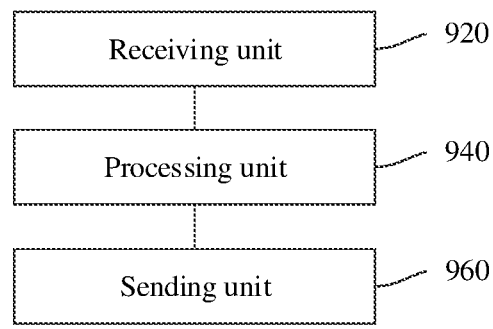
FIG. 10 is a block diagram of a NOF-based read control apparatus according to another example embodiment of this application.

FIG. 10 is a structural block diagram of a NOF-based read control apparatus according to an embodiment of this application. The apparatus may be implemented as a NOF engine or a functional module of a NOF engine. The apparatus includes a receiving unit 920, a sending unit 940, and a processing unit 960.

The receiving unit 920 is configured to perform at least one receiving step of the steps 401, 410, 507, 512, 612, 711, 801, and 805 in the foregoing method embodiments, and another explicit or implicit receiving step.

The sending unit 940 is configured to perform at least one sending step of the steps 403, 406, 409, 412, 508, 511, 514, 607, 612, 707, 712, 803, 807, and 808 in the foregoing method embodiments, and another explicit or implicit sending step.

The processing unit 960 is configured to perform at least one processing step of the steps 411, 506, 513, 606, 706, 802, 804, and 806 in the foregoing method embodiment, and another explicit or implicit processing step.

The receiving unit 920 may be implemented by a processor controlling a receiver (or a communications chip or a physical network interface or a virtual network interface). The sending unit 940 may be implemented by the processor controlling a transmitter (or a communications chip or a physical network interface or a virtual network interface). The processing unit 960 may be implemented by the processor, a memory, or at least one program or instruction in a memory.

Figure 11:
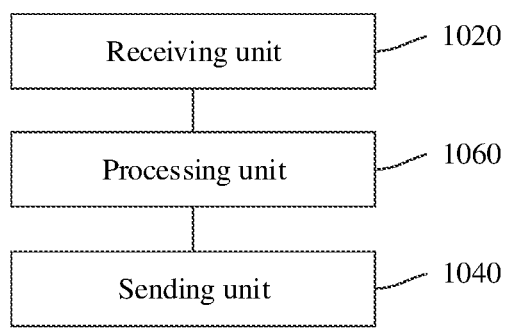
FIG. 11 is a block diagram of a NOF-based read control apparatus according to another example embodiment of this application.

FIG. 11 is a structural block diagram of a NOF-based read control apparatus according to an embodiment of this application. The apparatus may be implemented as an NVMe hard disk or a functional module of an NVMe hard disk. The apparatus includes a receiving unit 1020, a sending unit 1040, and a processing unit 1060.

The receiving unit 1020 is configured to perform at least one receiving step of the steps 404, 407, 413, 509, 515, 608, 614, 708, and 713 in the foregoing method embodiments, and another explicit or implicit receiving step.

The sending unit 1040 is configured to perform the sending step corresponding to the step 507 in the foregoing method embodiment, and another explicit or implicit sending step.

The processing unit 1060 is configured to perform at least one processing step of the steps 408, 413, 510, 516, 609, 610, 615, 616, 709, and 714 in the foregoing method embodiments, and another explicit or implicit processing step.

The receiving unit 1020 may be implemented by a processor controlling a receiver (or a communications chip or a physical network interface or a virtual network interface). The sending unit 1040 may be implemented by the processor controlling a transmitter (or a communications chip or a physical network interface or a virtual network interface). The processing unit 1060 may be implemented by the processor, a memory, or at least one program or instruction in a memory.

Figure 12:
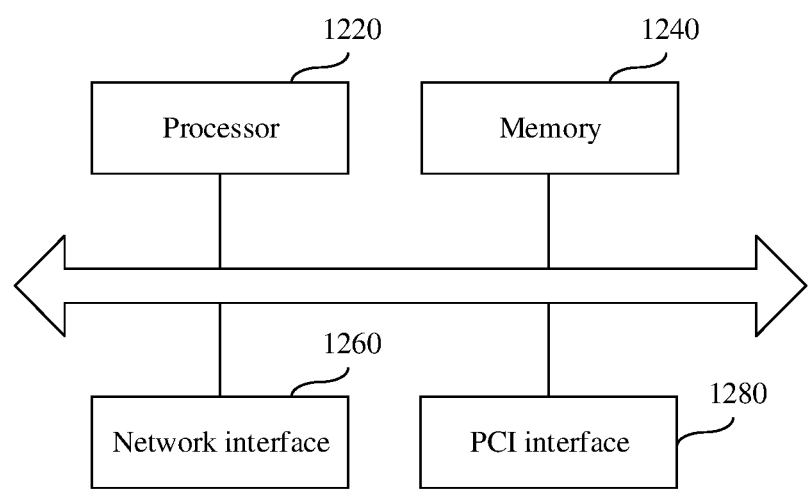
FIG. 12 is a block diagram of a NOF engine according to another example embodiment of this application.

FIG. 12 is a structural block diagram of a NOF engine according to an embodiment of this application. The NOF engine includes a processor 1220 and a memory 1240. The memory 1240 stores at least one instruction, and the at least one instruction is executed by the processor to implement the steps performed by the NOF engine in any one of the foregoing method embodiments.

Optionally, the NOF engine further includes a network interface 1260 and a PCI interface 1280. The network interface 1260 is configured to connect to a host by using a physical cable, and the PCI interface 1280 is configured to connect to an NVMe hard disk.

Figure 13:
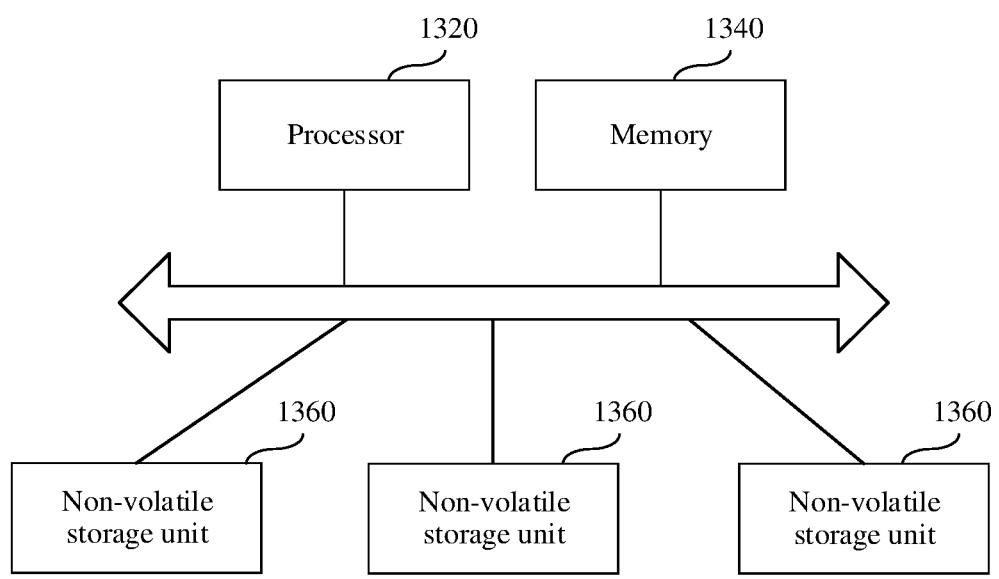
FIG. 13 is a block diagram of an NVMe hard disk according to another example embodiment of this application.

FIG. 13 is a structural block diagram of an NVMe hard disk according to an embodiment of this application. The NVMe hard disk includes a controller 1320 and a memory 1340. The memory 1340 stores at least one instruction, and the at least one instruction is executed by the controller 1320 to implement the steps performed by the NVMe hard disk in any one of the foregoing method embodiments. Optionally, the memory 1340 may alternatively be integrated into the controller 1320.

Optionally, the NVMe hard disk further includes at least one non-volatile storage unit 1360, and the non-volatile storage unit 1360 is configured to store data.

An embodiment of this application further provides a computer-readable storage medium. The storage medium stores at least one instruction, and the at least one instruction is executed to implement the steps performed by the NOF engine in any one of the foregoing method embodiments.

An embodiment of this application further provides a computer-readable storage medium. The storage medium stores at least one instruction, and the at least one instruction is executed to implement the steps performed by the NVMe hard disk in any one of the foregoing method embodiments.

An embodiment of this application further provides a computer program product. The program product stores at least one instruction, and the at least one instruction is executed to implement the steps performed by the NOF engine in any one of the foregoing method embodiments.

An embodiment of this application further provides a computer program product. The program product stores at least one instruction, and the at least one instruction is executed to implement the steps performed by the NVMe hard disk in any one of the foregoing method embodiments.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A read control method comprising:
receiving, by a non-volatile memory express over fabric (NOF) engine, using a communication link, a read request sent by a host;
sending, by the NOF engine, at least one read command to a non-volatile memory express (NVMe) hard disk according to the read request;

generating, by the NOF engine in response to congestion occurring on the communication link, a congestion flag corresponding to the communication link; and sending, by the NOF engine, the congestion flag to the NVMe hard disk, wherein the congestion flag instructs the NVMe hard disk to suspend processing of the read command corresponding to the communication link.

2. The method according to claim 1, wherein the sending, by the NOF engine, the congestion flag to the NVMe hard disk comprises:

determining, by the NOF engine, a submission queue corresponding to the communication link, wherein the submission queue stores a plurality of Submission Queue Entry (SQE) commands in the submission queue corresponding to the communication link, and wherein a first SQE command comprises at least one of a read command or a write command; and sending, by the NOF engine, in response to receiving a command read request that is of the NVMe hard disk and that is for the submission queue, a second SQE command carrying the congestion flag to the NVMe hard disk.

3. The method according to claim 2, wherein the method further comprises performing, after the sending, to the NVMe hard disk, the second SQE command:

sending, by the NOF engine, an idle frame to the host at an interval using the communication link;

generating, by the NOF engine, in response to receiving an acknowledgment signal of the idle frame, a congestion release flag corresponding to the communication link; and sending, by the NOF engine, the congestion release flag to the NVMe hard disk, wherein the congestion release flag instructs the NVMe hard disk to resume the processing of the read command corresponding to the communication link.

4. The method according to claim 3, wherein the sending, by the NOF engine, the congestion release flag to the NVMe hard disk comprises:

determining, by the NOF engine, the submission queue corresponding to the communication link, wherein the submission queue stores the plurality of SQE commands corresponding to the communication link; and sending, by the NOF engine, in response to receiving a command read request that is of the NVMe hard disk and that is for the submission queue, a third SQE command carrying the congestion release flag to the NVMe hard disk.

5. The method according to claim 3, wherein the sending, by the NOF engine, the congestion release flag to the NVMe hard disk comprises:

determining, by the NOF engine, the submission queue corresponding to the communication link, wherein the submission queue stores the plurality of SQE commands corresponding to the communication link; and sending, by the NOF engine, to the NVMe hard disk, a register write command pointing to a second user-defined address, wherein the second user-defined address is an address that stores the congestion release flag, and wherein the register write command carries an identifier of the submission queue and the congestion release flag.

6. The method according to claim 3, wherein the sending, by the NOF engine, the congestion release flag to the NVMe hard disk comprises:

determining, by the NOF engine, the submission queue corresponding to the communication link, wherein the submission queue stores the plurality of SQE commands corresponding to the communication link; and sending, by the NOF engine, a management command containing second user-defined content to the NVMe hard disk, wherein the second user-defined content carries an identifier of the submission queue and the congestion release flag.

7. The method according to claim 1, wherein the sending, by the NOF engine, the congestion flag to the NVMe hard disk comprises:

determining, by the NOF engine, a submission queue corresponding to the communication link, wherein the submission queue stores a Submission Queue Entry (SQE) command corresponding to the communication link; and sending, by the NOF engine, to the NVMe hard disk, a register write command pointing to a first user-defined address, wherein the first user-defined address is an address that stores the congestion flag, and wherein the register write command carries an identifier of the submission queue and the congestion flag.

8. The method according to claim 1, wherein the sending, by the NOF engine, the congestion flag to the NVMe hard disk comprises:

determining, by the NOF engine, a submission queue corresponding to the communication link, wherein the submission queue stores a Submission Queue Entry (SQE) command corresponding to the communication link; and sending, by the NOF engine, a management command containing first user-defined content to the NVMe hard disk, wherein the first user-defined content carries an identifier of the submission queue and the congestion flag.

9. A non-volatile memory express over fabric (NOF)-based read control method, comprising:

receiving, by a NOF engine having a data buffer corresponding to a communication link, using the communication link, a read request sent by a host, wherein the read request requests to read data of a first data amount, and wherein the first data amount exceeds a size of the data buffer corresponding to the communication link;

splitting, by the NOF engine, the read request into K read commands, wherein the read command requests to read data of a second data amount, and wherein the second data amount is less than the first data amount;

sending, by the NOF engine, m read commands to a non-volatile memory express (NVMe) hard disk, wherein m≤K, and a product of m and the second data amount is not greater than the size of the data buffer corresponding to the communication link; and suspending, by the NOF engine in response to congestion occurring on the communication link, sending of a remaining read command to the NVMe hard disk.

10. The method according to claim 9, wherein the method further comprises performing, after the suspending the sending of the remaining read command to the NVMe hard disk:

receiving, by the NOF engine, data read by the NVMe hard disk according to the m read commands;

storing, by the NOF engine, the data in the data buffer corresponding to the communication link; and sending, by the NOF engine in response to the congestion on the communication link being released, the data in the data buffer to the host using the communication link.

11. The method according to claim 10, wherein the method further comprises performing, after the sending the data in the data buffer to the host:
continuing, by the NOF engine, to send n read commands to the NVMe hard disk, wherein n≤K−m, and wherein a product of n and the second data amount is not greater than the size of the data buffer corresponding to the communication link.

12. A non-volatile memory express over fabric (NOF) engine, comprising:
at least one processor; and
a memory, storing a program to be executed by the at least one processor, the program including instructions for:
receiving, using a communication link, a read request sent by a host;
sending at least one read command to a non-volatile memory express (NVMe) hard disk according to the read request;
generating a congestion flag corresponding to the communication link in response to congestion occurring on the communication link; and
sending the congestion flag to the NVMe hard disk, wherein the congestion flag instructs the NVMe hard disk to suspend processing of the read command corresponding to the communication link.

13. The NOF engine according to claim 12, wherein the instructions for sending the congestion flag to the NVMe hard disk include instructions for:
determining a submission queue corresponding to the communication link, wherein the submission queue stores a plurality of Submission Queue Entry (SQE) commands in the submission queue corresponding to the communication link, and wherein a first SQE command comprises at least one of a read command or a write command; and
sending, in response to receiving a command read request that is of the NVMe hard disk and that is for the submission queue, a second SQE command carrying the congestion flag to the NVMe hard disk.

14. The NOF engine according to claim 13, wherein the program further includes instructions for performing, after the sending, to the NVMe hard disk, the second SQE command:
sending, by the NOF engine, an idle frame to the host at an interval using the communication link;
generating, by the NOF engine, in response to receiving an acknowledgment signal of the idle frame, a congestion release flag corresponding to the communication link; and
sending, by the NOF engine, the congestion release flag to the NVMe hard disk, wherein the congestion release flag instructs the NVMe hard disk to resume the processing of the read command corresponding to the communication link.

15. The NOF engine according to claim 14, wherein the instructions for sending the congestion release flag to the NVMe hard disk include instructions for:
determining, by the NOF engine, the submission queue corresponding to the communication link, wherein the submission queue stores the plurality of SQE commands corresponding to the communication link; and
performing at least one of:
sending, in response to receiving a command read request that is of the NVMe hard disk and that is for the submission queue, a third SQE command carrying the congestion release flag to the NVMe hard disk;
sending, to the NVMe hard disk, a register write command pointing to a second user-defined address, wherein the second user-defined address is an address that stores the congestion release flag, and wherein the register write command carries an identifier of the submission queue and the congestion release flag; or
sending, a management command containing second user-defined content to the NVMe hard disk, wherein the second user-defined content carries the identifier of the submission queue and the congestion release flag.

16. The NOF engine according to claim 12, wherein the instructions for sending the congestion flag to the NVMe hard disk include instructions for:
determining a submission queue corresponding to the communication link, wherein the submission queue stores a Submission Queue Entry (SQE) command corresponding to the communication link; and
sending, by the NOF engine, to the NVMe hard disk, a register write command pointing to a first user-defined address, wherein the first user-defined address is an address that stores the congestion flag, and wherein the register write command carries an identifier of the submission queue and the congestion flag.

17. The NOF engine according to claim 12, wherein the instructions for sending, by the NOF engine, the congestion flag to the NVMe hard disk include instructions for:
determining, by the NOF engine, a submission queue corresponding to the communication link, wherein stores a Submission Queue Entry (SQE) command corresponding to the communication link; and
sending, by the NOF engine, a management command containing first user-defined content to the NVMe hard disk, wherein the first user-defined content carries an identifier of the submission queue and the congestion flag.

18. A non-volatile memory express over fabric (NOF) engine, comprising:
at least one processor; and
a memory, wherein the memory comprises a data buffer corresponding to a communication link, wherein the memory stores a program to be executed by the at least one processor, the program including instructions for:
receiving, using the communication link, a read request sent by a host, wherein the read request requests to read data of a first data amount, and wherein the first data amount exceeds a size of the data buffer of the communication link;
splitting the read request into K read commands, wherein the read command requests to read data of a second data amount, and wherein the second data amount is less than the first data amount;
sending m read commands to a non-volatile memory express (NVMe) hard disk, wherein m≤K, and wherein a product of m and the second data amount is not greater than the size of the data buffer of the communication link; and
suspending sending of a remaining read command to the NVMe hard disk in response to congestion occurring on the communication link.

19. The NOF engine according to claim 18, wherein the program further includes instructions for performing, after the suspending the sending of the remaining read command to the NVMe hard disk:
receiving data read by the NVMe hard disk according to the m read commands;

storing the data in the data buffer corresponding to the communication link; and sending, in response to the congestion on the communication link being released, the data in the data buffer to the host using the communication link.

20. The NOF engine according to claim 19, wherein the program further includes performing, after the sending the data in the data buffer to the host:

continuing, by the NOF engine, to send n read commands to the NVMe hard disk, wherein $n \leq K-m$, and wherein a product of n and the second data amount is not greater than the size of the data buffer corresponding to the communication link.

* * * * *